US008504737B2

(12) United States Patent
Rysavy

(10) Patent No.: US 8,504,737 B2
(45) Date of Patent: Aug. 6, 2013

(54) SERIAL LINE PROTOCOL FOR EMBEDDED DEVICES

(76) Inventor: Randal S. Rysavy, Kasson, MN (US)

( * ) Notice: Subject to any disclaimer, the term of this patent is extended or adjusted under 35 U.S.C. 154(b) by 0 days.

(21) Appl. No.: 12/873,548

(22) Filed: Sep. 1, 2010

(65) Prior Publication Data
US 2011/0072162 A1 Mar. 24, 2011

Related U.S. Application Data

(60) Provisional application No. 61/245,112, filed on Sep. 23, 2009, provisional application No. 61/245,973, filed on Sep. 25, 2009.

(51) Int. Cl.
G06F 3/00 (2006.01)
G06F 13/00 (2006.01)
G06F 13/42 (2006.01)

(52) U.S. Cl.
USPC .......... 710/5; 710/20; 710/21; 710/100; 710/105; 710/106

(58) Field of Classification Search
USPC ............... 710/5, 20, 21, 100, 105, 106
See application file for complete search history.

(56) References Cited

U.S. PATENT DOCUMENTS

| 4,402,046 A | 8/1983 | Cox et al. |
| 5,121,480 A | 6/1992 | Bonke et al. |
| 5,297,029 A | 3/1994 | Nakai |
| 5,353,410 A | 10/1994 | Macon et al. |
| 5,732,409 A | 3/1998 | Ni |
| 5,734,821 A * | 3/1998 | Chung et al. ............ 709/200 |
| 5,974,502 A | 10/1999 | DeKoning et al. |
| 6,049,838 A | 4/2000 | Miller et al. |
| 6,081,849 A | 6/2000 | Born et al. |
| 6,145,072 A | 11/2000 | Shams et al. |
| 6,158,004 A | 12/2000 | Mason et al. |
| 6,212,617 B1 | 4/2001 | Hardwick |
| 6,247,040 B1 | 6/2001 | Born et al. |
| 6,324,594 B1 | 11/2001 | Ellis et al. |
| 6,363,470 B1 | 3/2002 | Laurenti et al. |
| 6,385,683 B1 | 5/2002 | DeKoning et al. |
| 6,449,666 B2 | 9/2002 | Noeldner et al. |
| 6,490,635 B1 | 12/2002 | Holmes |

(Continued)

OTHER PUBLICATIONS

Sun et al.; On the Use of Strong BCH Codes for Improving Multilevel NAND Flash Memory Storage Capacity; ECSE Department, Rensselaer Polytechnic Institute, Aug. 2006; USA.

(Continued)

Primary Examiner — Idriss N Alrobaye
Assistant Examiner — Getente A Yimer

(57) ABSTRACT

Described embodiments provide a transceiver for transferring data between a media controller and a host device through a communication link. The transceiver includes a first interrupt generator configured to i) generate a first interrupt when a command is received from the host device and ii) provide the received command to a receive buffer. A command processing module i) retrieves the received command from the receive buffer, ii) processes the received command, and iii) provides data request data in response to the received command to a transmit buffer. A datagram generator is configured to provide datagram data to the transmit buffer and a second interrupt generator is configured to generate a second interrupt when data in the transmit buffer is ready for transmission. The transmit buffer interleaves i) the data request data in response to the received command and ii) the datagram data, when provided to the communication link.

15 Claims, 14 Drawing Sheets

(56) References Cited

U.S. PATENT DOCUMENTS

| | | |
|---|---|---|
| 6,567,094 B1 | 5/2003 | Curry et al. |
| 6,633,942 B1 | 10/2003 | Balasubramanian |
| 6,678,785 B2 | 1/2004 | Lasser et al. |
| 6,725,329 B1 | 4/2004 | Ng et al. |
| 6,751,680 B2 | 6/2004 | Langerman et al. |
| 7,069,559 B2 | 6/2006 | Janssen et al. |
| 7,286,549 B2 | 10/2007 | Gaur |
| 7,290,066 B2 | 10/2007 | Voorhees et al. |
| 7,408,834 B2 | 8/2008 | Conley et al. |
| 7,461,183 B2 | 12/2008 | Ellis et al. |
| 7,472,331 B2 | 12/2008 | Kim |
| 7,512,847 B2 | 3/2009 | Bychkov et al. |
| 7,590,803 B2 | 9/2009 | Wintergerst |
| 7,650,449 B2 * | 1/2010 | Lu ................................. 710/106 |
| 7,653,778 B2 | 1/2010 | Merry et al. |
| 7,925,847 B2 * | 4/2011 | Ellis et al. ..................... 711/154 |
| 2003/0051078 A1 | 3/2003 | Yoshitake |
| 2003/0110325 A1 | 6/2003 | Roach et al. |
| 2003/0167395 A1 | 9/2003 | Chang et al. |
| 2004/0044873 A1 | 3/2004 | Wong et al. |
| 2004/0177212 A1 | 9/2004 | Chang et al. |
| 2004/0243684 A1 * | 12/2004 | Ha et al. ........................ 709/208 |
| 2005/0114729 A1 | 5/2005 | Nielsen et al. |
| 2005/0144516 A1 | 6/2005 | Gonzalez et al. |
| 2005/0203988 A1 | 9/2005 | Nollet et al. |
| 2006/0050693 A1 | 3/2006 | Bury et al. |
| 2006/0095611 A1 | 5/2006 | Winchester et al. |
| 2006/0123259 A1 | 6/2006 | Yokota et al. |
| 2007/0028040 A1 | 2/2007 | Sinclair |
| 2007/0109856 A1 | 5/2007 | Pellicone et al. |
| 2007/0255889 A1 | 11/2007 | Yogev et al. |
| 2007/0266200 A1 | 11/2007 | Gorobets et al. |
| 2008/0034153 A1 | 2/2008 | Lee et al. |
| 2008/0052446 A1 | 2/2008 | Lasser et al. |
| 2008/0082726 A1 | 4/2008 | Elhamias |
| 2008/0120456 A1 | 5/2008 | Lee et al. |
| 2008/0140916 A1 | 6/2008 | Oh et al. |
| 2008/0155145 A1 | 6/2008 | Stenfort |
| 2008/0162079 A1 | 7/2008 | Astigarraga et al. |
| 2008/0224924 A1 * | 9/2008 | Lethbridge ................. 342/357.1 |
| 2008/0263307 A1 | 10/2008 | Adachi |
| 2008/0279205 A1 | 11/2008 | Sgouros et al. |
| 2009/0051823 A1 * | 2/2009 | Tsurumoto et al. ............ 348/734 |
| 2009/0138663 A1 | 5/2009 | Lee et al. |
| 2009/0172308 A1 | 7/2009 | Prins et al. |
| 2009/0271562 A1 | 10/2009 | Sinclair |
| 2009/0271796 A1 | 10/2009 | Kojima |
| 2009/0282301 A1 | 11/2009 | Flynn et al. |
| 2009/0285228 A1 | 11/2009 | Bagepalli et al. |
| 2009/0287859 A1 | 11/2009 | Bond et al. |
| 2009/0300277 A1 | 12/2009 | Jeddeloh |
| 2009/0313444 A1 | 12/2009 | Nakamura |
| 2010/0011260 A1 | 1/2010 | Nagadomi et al. |
| 2010/0023800 A1 | 1/2010 | Harari et al. |
| 2010/0122148 A1 | 5/2010 | Flynn et al. |
| 2010/0325317 A1 | 12/2010 | Kimelman et al. |
| 2011/0041039 A1 | 2/2011 | Harari et al. |
| 2011/0055458 A1 | 3/2011 | Kuehne |
| 2011/0099355 A1 * | 4/2011 | Tran ............................. 712/217 |

OTHER PUBLICATIONS

Micro Technology, Inc.; NAND Flash 101: An Introduction to NAND Flash and How to Design it into your next Product; TN-29-19; 2006; pp. 1-28; Micron Technology, Inc. Boise, Idaho, USA.

Andrew Birrell & Michael Isard, et al., A Design for High-Performance Flash Disks, ACM SIGOPS Operating Systems Review, vol. 41, Issue 2, pp. 88-93, (Apr. 2007).

Jeong-Uk Kang & Heeseung Jo, et al., A Superblock-Based Flash Translation Layer for NAND Flash Memory, Proceedings of the 6th ACM & IEEE International Conference on Embedded Software, pp. 161-170, (Oct. 22-25, 2006).

TCG Core Architecture Specification, Version 2.0, Trusted Computing Group, 2009 USA.

TCG Storage Interface Interactions Specification, Version 1.0, Trusted Computing Group, 2009 USA.

TCG Storage SSC: Enterprise, Version 1.0, Trusted Computing Group 2009 USA.

TCG Storage SSC: Opal, Version 1.0, Trusted Computing Group 2009 USA.

Specification for the Advanced Encryption Standard (AES), Federal Information Processing Standard (FIPS) Publication 197, 2001 USA.

Specification for the Secure Hash Standard (SHS), FIPS Publication 180-3 (2008), National Institute of Standards and Technology (NIST) USA.

* cited by examiner

700

800

1100

1300

SERIAL LINE PROTOCOL FOR EMBEDDED DEVICES

CROSS-REFERENCE TO RELATED APPLICATIONS

This application claims the benefit of the filing date of U.S. provisional application Nos. 61/245,112 filed Sep. 23, 2009, and 61/245,973 filed Sep. 25, 2009, the teachings of which are incorporated herein in their entireties by reference.

The subject matter of this application is related to U.S. patent application Ser. Nos. 12/436,227 filed 6 May 2009, Ser. No. 12/475,710 filed 1 Jun. 2009, Ser. No. 12/475,716 filed 1 Jun. 2009, Ser. No. 12/477,996 filed 4 Jun. 2009, Ser. No. 12/478,013 filed 4 Jun. 2009, Ser. No. 12/508,879 filed 24 Jul. 2009, Ser. No. 12/508,915 filed 24 Jul. 2009, Ser. No. 12/643,471 filed 21 Dec. 2009, Ser. No. 12/649,490 filed 30 Dec. 2009, Ser. No. 12/722,828 filed 12 Mar. 2010, Ser. No. 12/730,627 filed 24 Mar. 2010, Ser. No. 12/731,631 filed 25 Mar. 2010, Ser. No. 12/767,985 filed 27 Apr. 2010, Ser. No. 12/768,058 filed 27 Apr. 2010, Ser. No. 12/769,882 filed 29 Apr. 2010, Ser. No. 12/769,910 filed 29 Apr. 2010, Ser. No. 12/873,450 filed Sep. 1, 2010, and Ser. No. 12/873,512 filed Sep. 1, 2010, the teachings of all of which are incorporated herein in their entireties by reference.

BACKGROUND OF THE INVENTION

1. Field of the Invention

The present invention relates to a universal asynchronous receiver/transmitter (UART) circuit for embedded devices such as media controllers for storage devices such as hard disk drives (HDDs) and solid state disks (SSDs).

2. Description of the Related Art

Flash memory is a type of non-volatile memory that is electrically erasable and re-programmable. Flash memory is primarily used in memory cards and USB flash drives for general storage and transfer of data between computers and other digital products. Flash memory is a specific type of electrically erasable programmable read-only memory (EEPROM) that is programmed and erased in large blocks. One commonly employed type of flash memory technology is NAND flash memory. NAND flash memory forms the core of the flash memory available today, especially for removable universal serial bus (USB) storage devices known as USB flash drives, as well as most memory cards. NAND flash memory exhibits fast erase and write times, requires small chip area per cell, and has high endurance. However, the I/O interface of NAND flash memory does not provide full address and data bus capability and, thus, generally does not allow random access to memory locations.

There are three basic operations for NAND devices: read, write and erase. The read and write operations are performed on a page by page basis. Page sizes are generally $2^N$ bytes, where N is an integer, with typical page sizes of, for example, 2,048 bytes (2 kb), 4,096 bytes (4 kb), 8,192 bytes (8 kb) or more per page. Pages are typically arranged in blocks, and an erase operation is performed on a block by block basis. Typical block sizes are, for example, 64 or 128 pages per block. Pages must be written sequentially, usually from a low address to a high address. Lower addresses cannot be rewritten until the block is erased.

A hard disk is addressed linearly by logical block address (LBA). A hard disk write operation provides new data to be written to a given LBA. Old data is over-written by new data at the same physical LBA. NAND flash memories are accessed analogously to block devices, such as hard disks. NAND devices address memory linearly by page number. However, each page might generally be written only once since a NAND device requires that a block of data be erased before new data is written to the block. Thus, for a NAND device to write new data to a given LBA, the new data is written to an erased page that is a different physical page than the page previously used for that LBA. Therefore, NAND devices require device driver software, or a separate controller chip with firmware, to maintain a record of mappings of each LBA to the current page number where its data is stored. This record mapping is typically managed by a flash translation layer (FTL) in software that might generate a logical-to-physical translation table. The flash translation layer corresponds to the media layer of software and/or firmware controlling an HDD.

Storage devices such as HDDs and SSDs commonly employ a separate media controller chip to facilitate use of the storage device. In general, such a media controller chip might process operations of the storage device, for example read or write operations. The media controller chip might be implemented as a system on chip (SoC) having one or more processors. One or more firmware modules will be installed to run on each of the one or more processors, with each firmware module including one or more sub-components. For example, the media controller firmware might include firmware modules and sub-components to process one or more diagnostic operations.

An HDD or SSD media controller might operate in compliance with one or more host communication protocols, for example, the Small Computer System Interface ("SCSI") protocol, the Serial Attached SCSI ("SAS") protocol, or the Serial Advanced Technology Attachment ("SATA") protocol. The SCSI protocol is a communications protocol where multiple components are connected to the same bus and a process of arbitration determines which device gets access to the bus at any point in time. The SCSI command set is described in the SCSI Primary Commands standard (SCSI Primary Commands—SPC-3 Revision 23, May 4, 2005, hereinafter "SCSI SPC standard," included by reference herein). The SAS protocol is a serial protocol that employs the standard SCSI command set, but is point-to-point, meaning that each SAS device is connected by a dedicated bus to a device that originates requests (an initiator). The SATA protocol is a serial protocol that uses the standard ATA command set. The ATA command set is described in the AT attachment standard (AT Attachment 8—ATA/ATAPI Command Set (ATA8-ACS) Revision 4a, May 21, 2007, hereinafter "ATA standard," included by reference herein). Although, in some applications, it might be desirable to employ SAS and SATA devices interchangeably, in general, separate host interface modules within the media controller chip might be required.

Since an HDD or SSD might receive one or more commands such as read, write or erase operations, before a previously received command has completed, a queue might generally maintain a list of commands received while a previous command is being processed. In storage devices operating in accordance with the SCSI standard, a control field, such as the SCSI Queue Algorithm Modifier (QAM) field, might be employed to indicate whether reordering of the queue of received commands is permitted. As defined by the SCSI Primary Commands standard (SPC-3, Section 7.4.6, pg. 285, 2005, included by reference herein), when the QAM field has a value of zero, command reordering is restricted, and queued commands must be processed in the order in which they are received. When the QAM field has a value of one, command reordering is permitted, and the storage device may process queued commands in any order. Further, a control field, such as the SCSI Task Attribute field, might be employed to indicate how commands are queued. As defined by the SCSI Architecture Model (SAM-5, Section 8.9, pp. 123-127, 2009, included by reference herein), the Task Attribute field defines the attributes SIMPLE, ORDERED, HEAD OF QUEUE, or ACA, which indicate how a received command should be queued. For example, a received command having the HEAD OF QUEUE attribute is placed at the head of the queue, ahead of any previously queued commands.

Diagnostic operations are typically small functions implemented in the media controller firmware. Each diagnostic operation might perform a specific task to help debug a given device problem. Common diagnostic operations might, for example, include reading or writing a register, performing a test, and reporting device status. A request for the media controller to perform a diagnostic operation might be initiated from one or more different sources. For example, a typical SAS or SATA host device might request a diagnostic operation be performed. Further, other host types might be employed such as, for example, USB, and, in a design and development environment, other communication links might be employed. Typically, the media controller handles diagnostic operations from different sources independently. Thus, every firmware layer generally might include a module for each diagnostic operation, and often each firmware layer might include separate module implementations for each type of source.

A universal asynchronous receiver/transmitter (UART) is often used during design and development of an embedded device to provide a way to issue commands to the embedded device and transfer and display logging information indicating the status of the embedded device. A UART is often employed in conjunction with a computer serial port operating according to the RS-232 standard. For RS-232 UARTs to transfer binary data, the binary data is typically converted to ASCII (e.g., through Base64 encoding), or the UART switches into a binary mode to transfer the binary data. Both of these methods add complexity and inefficiency to the implementation. Further, typical control software or firmware of RS-232 UARTs do not allow for asynchronous transfer of "datagram" type messages interleaved with their main "command processing" messages.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a transceiver for transferring data between a media controller and a host device through a communication link. The transceiver includes a first interrupt generator configured to i) generate a first interrupt when a command is received from the host device and ii) provide the received command to a receive buffer. A command processing module i) retrieves the received command from the receive buffer, ii) processes the received command, and iii) provides data request data in response to the received command to a transmit buffer. A datagram generator is configured to provide datagram data to the transmit buffer and a second interrupt generator is configured to generate a second interrupt when data in the transmit buffer is ready for transmission. The transmit buffer interleaves i) the data request data in response to the received command and ii) the datagram data, when provided to the communication link.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, a transceiver is provided for transferring data between a media controller and a host device through a communication link. The transceiver includes a first interrupt generator configured to i) generate a first interrupt when a command is received from the host device and ii) provide the received command to a receive buffer. A command processing module i) retrieves the received command from the receive buffer, ii) processes the received command, and iii) provides data request data in response to the received command to a transmit buffer. A datagram generator is configured to provide datagram data to the transmit buffer and a second interrupt generator is configured to generate a second interrupt when data in the transmit buffer is ready for transmission. The transmit buffer interleaves i) the data request data in response to the received command and ii) the datagram data, when provided to the communication link.

Table 1 defines a list of acronyms employed throughout this specification as an aid to understanding the described embodiments of the present invention:

TABLE 1

| HDD | Hard Disk Drive | ECC | Error Correction Code |
|---|---|---|---|
| SSD | Solid State Disk | SPI | Serial Peripheral Interface |
| API | Application Programming Interfaces | UART | Universal Asynchronous Receiver/Transmitter |
| USB | Universal Serial Bus | SWD | Serial Wire Debug |
| SATA | Serial Advanced Technology Attachment | JTAG | Joint Test Action Group |
| SCSI | Small Computer System Interface | SLIP | Serial Line Internet Protocol |
| SAS | Serial Attached SCSI | FIFO | First-In, First-Out |
| SoC | System-on-Chip | FTL | Flash Translation Layer |
| DMA | Direct Memory Access | FC | Fibre Channel |
| LLD | Low Level Driver | RAID | Redundant Array of Independent Disks |
| LBA | Logical Block Address | BAM | Buffer Allocation Module |
| LSN | Logical Sector Number | QAM | Queue Algorithm Modifier |
| RX | Receive | HCPS | Host Command Processor and Scheduler |
| TX | Transmit | HMCH | Host Management Command Handler |
| ACK | Acknowledge | CDH | Common Diagnostic Handler |
| HAL | Hardware Abstraction Layer | EDH | End Diagnostic Handler |
| LLHI | Low Level Host Interface | CDT | Command Data Transport |
| XTEA | eXtended Tiny Encryption Algorithm | LDT | Logging Data Transport |

Figure 1:
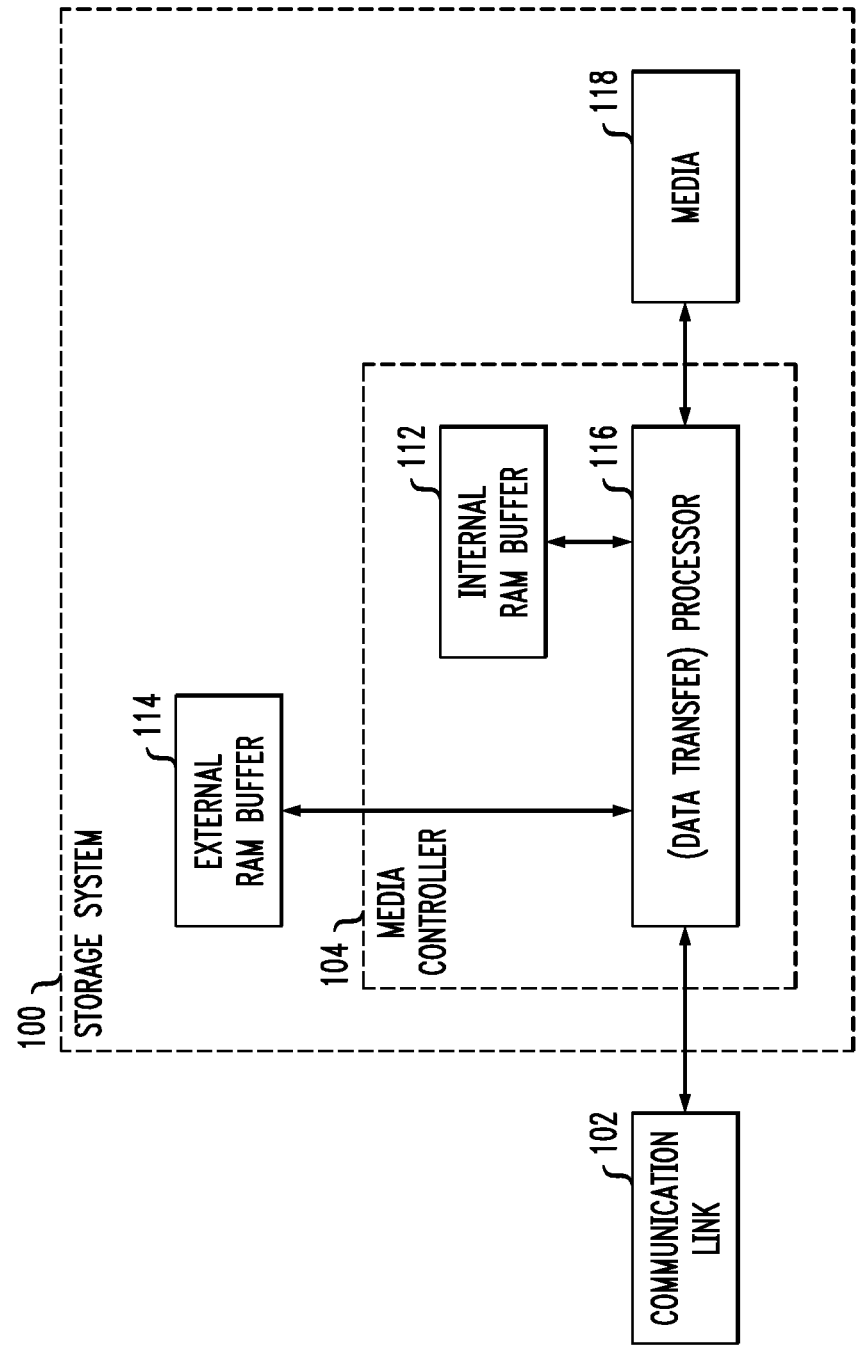
FIG. 1 shows a block diagram of a memory storage system implementing diagnostic request processing in accordance with exemplary embodiments of the present invention.

FIG. 1 shows a block diagram of memory storage system 100 implementing diagnostic requests for direct block access storage devices in accordance with exemplary embodiments of the present invention. As shown, memory storage system 100 is electrically coupled to communication link 102. Memory storage system 100 comprises media controller 104, optional external RAM buffer 114, and media 118. Although generally described herein as flash media, media 118 might be implemented as at least one of an SSD, an HDD, or a hybrid magnetic and solid state storage system. Communication link 102 is employed for communication with one or more external devices, such as a computer system or networking device, which interface with memory storage system 100. Communication link 102 might be a custom-designed communication link, or might conform to a standard communication protocol such as, for example, a Serial Attached SCSI ("SAS") protocol bus, a Serial Advanced Technology Attachment ("SATA") protocol bus, a Universal Serial Bus ("USB"), a Fibre Channel ("FC") link, an Ethernet link, an IEEE 802.11 link, an IEEE 802.15 link, and IEEE 802.16 link, or any other similar interface link for connecting a peripheral device to a host device.

Media controller 104 controls transfer of data between media 118 and an external device coupled to communication link 102. Media controller 104 might be implemented as a system-on-chip (SoC). Media controller 104 might include internal RAM buffer 112 and might also be coupled to additional external memory, shown as external RAM buffer 114. In an exemplary embodiment, internal RAM buffer 112 comprises 128 kB of static RAM (SRAM) and external RAM buffer 114 comprises 512 MB of double data rate version 2 dynamic RAM (DDR2 DRAM). RAM buffer 112 might act as a cache for processor 116, while RAM buffer 114 might act as a read/write buffer between media 118 and communication link 102. Processor 116 includes software and/or firmware as needed for operation, including for tracking and conflict checking of outstanding access requests in accordance with exemplary embodiments of the present invention, as described subsequently.

Although shown in FIG. 1 as a single processor, processor 116 might be implemented by multiple processors. For example, end users of media controller 100 might require higher or lower performance depending on their intended application. The performance requirements might affect the type of processors employed in the SoC, or the number of processors employed in the SoC. For example, a lower performance SATA SSD media controller might employ a single ARM Cortex M3 processor while a higher performance SAS SSD media controller might employ three ARM Cortex R4 processors (ARM Cortex processors are by ARM Holdings, plc, Cambridge, UK). Processor 116 includes software and/or firmware as needed for operation. For embodiments having multiple processors, inter-processor communication might be employed, such as described in related U.S. patent application Ser. No. 12/436,227, filed May 6, 2009.

Although shown in FIG. 1 as a single media device, media 118 might be implemented as one or more storage media, such as described in related U.S. patent application Ser. No. 12/722,828, filed Mar. 12, 2010. For example, media 118 might be implemented as an SSD including one or more physical flash silicon dies. In some embodiments, host requests might be striped across two or more of the dies, analogously to hard drives in a redundant array of independent disks (RAID), to provide parallel execution. In other embodiments, each flash die might be configured as a separate, stand-alone flash memory device without data striping. Similarly, media 118 might be implemented as one or more HDDs or hybrid magnetic and solid state storage systems.

Figure 2:
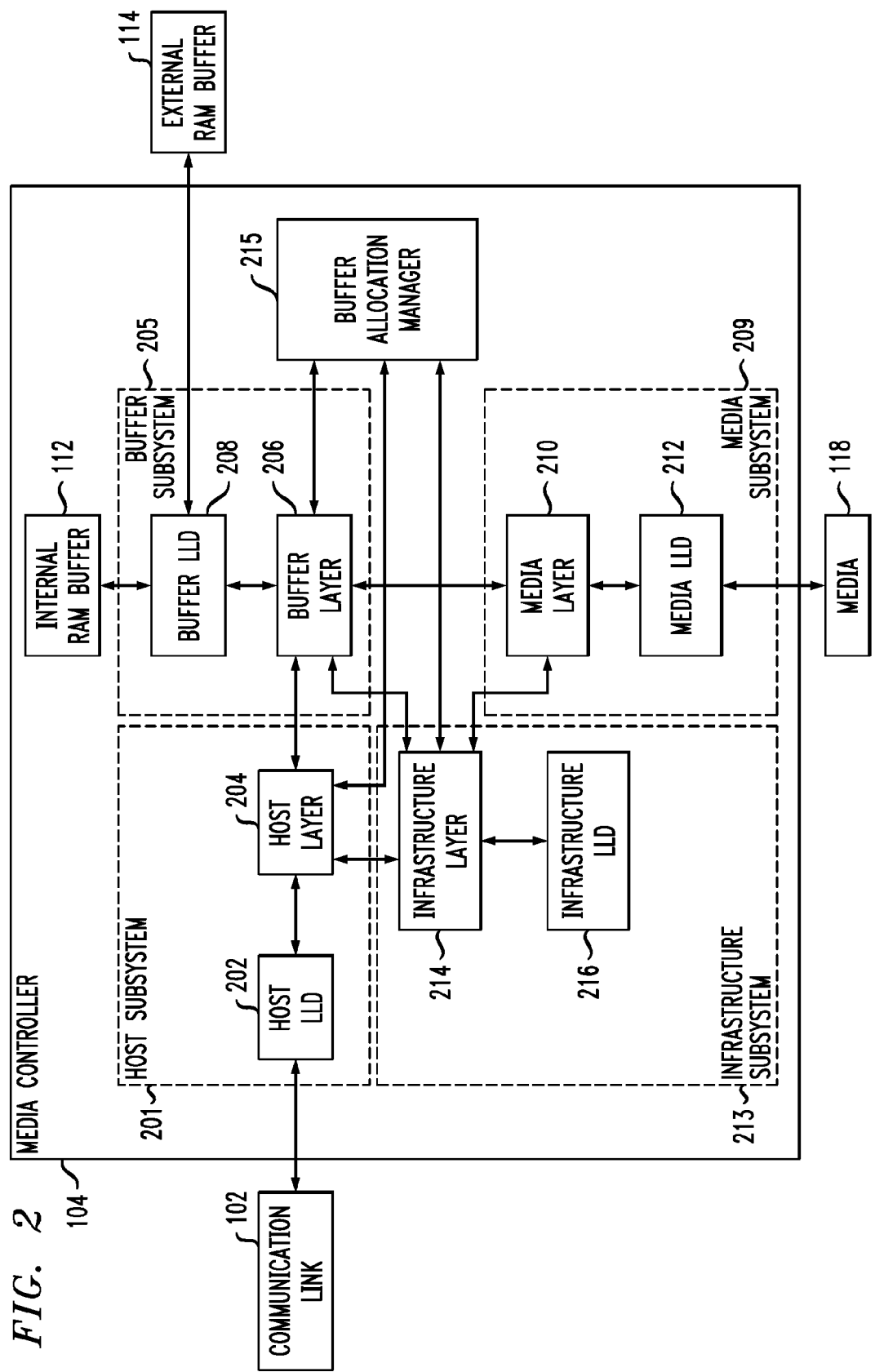
FIG. 2 shows an exemplary functional block diagram of sub-modules employed by the memory storage system of FIG. 1.

FIG. 2 shows an exemplary functional block diagram of sub-modules implemented as software, hardware, or some combination thereof, within processor 116 of media controller 104. As shown in FIG. 2, media controller 104 might employ one or more functional modules, separating low-level hardware-specific signal and timing requirements from the higher-level functionality of the controller as a whole. The modules might include Application Programming Interfaces (APIs), which are protocols or formats used by software to communicate, via hardware communication links, between sub-applications within the software. As shown, embodiments of media controller 104 might include five main modules: host subsystem 201, buffer subsystem 205, media subsystem 209, infrastructure subsystem 213 and buffer allocation module (BAM) 215. Additionally, one or more of the main modules within media controller 104 might be partitioned into a high level module (e.g., host layer 204, buffer layer 206, media layer 210, and infrastructure layer 214) and a low level module (e.g., host LLD 202, buffer LLD 208, media LLD 212, and infrastructure LLD 216).

In operation, for example, media controller 104 might receive one or more requests for media access from external devices, such as requests for read or write operations, from communication link 102. Such requests for access to media 118 generally include at least one logical block address (LBA) where data should be read or written. For example, the requests could be to read from or write to a i) single media address, ii) a group of contiguous media addresses, or iii) a group of non-contiguous media addresses. Received requests are processed by host subsystem 201. In general, host layer 204 might process higher level host operations (e.g., host command handlers) and host LLD 202 might process lower level host operations (e.g., parsing host commands to the host layer). Commands accessing a group of non-contiguous media addresses might be processed such as described in related U.S. patent application Ser. No. 12/508,915, filed Jul. 24, 2009. One or more received commands might be queued or tracked as described in related U.S. patent application Ser. No. 12/649,490, filed Dec. 30, 2009. Host subsystem 201 might also perform encryption and decryption of data such as described in related U.S. patent application Ser. Nos. 12/767, 985 and 12/768,058, both filed Apr. 27, 2010.

Media subsystem 209 translates the LBA into a physical address of the desired data, for example as described in related U.S. patent application Ser. No. 12/643,471, filed Dec. 21, 2009, Ser. No. 12/769,910, filed Apr. 29, 2010 and Ser. No. 12/769,882, filed Apr. 29, 2010. Media subsystem 209 interfaces with buffer subsystem 205. Media layer 210 might process higher level media operations (e.g., logical-to-physical address translation), while media LLD 212 might process lower level media operations (e.g. media hardware-specific read/write/erase). Media layer 210 also might enable error recovery and wear-leveling routines for media 118, such as described in related U.S. patent application Ser. No. 12/475, 710, filed Jun. 1, 2009, Ser. No. 12/475,716, filed Jun. 1, 2009 and Ser. No. 12/508,879, filed Jul. 24, 2009. In embodiments of the present invention, media layer 210 might support enterprise system sector sizes (e.g., 520 or 528 bytes per sector instead of 512 bytes), such as described in related U.S. patent application Ser. Nos. 12/477,996 and 12/478,013, both filed Jun. 4, 2009.

Since data transfers between communication link 102 and media 118 might be temporarily stored in buffer memory, buffer subsystem 205 generally directs the data traffic between host subsystem 201 and media subsystem 209. For example, if an external host (not shown) provides, via communication link 102, data to be written to media 118, buffer subsystem 205 might coordinate temporary storage of the data in buffer 114 until media subsystem 209 coordinates writing the data to media 118. Similarly, if the external host requests to read data from media 118, buffer subsystem 205 might temporarily store the data in buffer 114 until host layer 204 coordinates sending the data to the host via communication link 102.

In general, buffer layer 206 might process higher level buffer and cache operations (e.g., cache and buffer allocation), while buffer LLD 208 processes lower level buffer operations (e.g., RAM hardware-specific commands). Buffering of data might occur, for example, as described in related U.S. patent application Ser. No. 12/722,828, filed Mar. 12, 2010, Ser. No. 12/730,627, filed Mar. 24, 2010, and Ser. No. 12/731,631, filed Mar. 25, 2010. Infrastructure subsystem 213 might generally serve as an operating system for media controller 104, with infrastructure layer 214 performing higher level processing operations (e.g., operating system operations) and infrastructure LLD 216 performing lower level operating system operations (e.g., initialization, timers, interrupts).

As shown in FIG. 2, media controller 104 might also include Buffer Allocation Module (BAM) 215. As shown, BAM 215 is coupled to host layer 204, buffer layer 206, and infrastructure layer 214. In embodiments of the present invention, BAM 215 might be employed to provide acceleration and flexibility in managing one or more cache buffers in RAM buffers 112 and 114 and the transfer of information between host layer 204 and buffer layer 206. For example, BAM 215 might maintain cache management data that describes data blocks stored in a cache, the status of the data blocks stored in the cache (e.g., valid, dirty, etc.), the physical address of that data, and which modules of media controller 104 are accessing the data.

As will be described in greater detail below, BAM 215 might typically include i) a first control sequencer for host command and context processing and ii) a second control sequencer for buffer command and context processing. In general, a context is a data structure used within media controller 104 that specifies the information necessary to send or receive data (e.g., to send a data frame or frame information structure (FIS) on communication link 102, to perform direct memory access (DMA), etc.). Since both host subsystem 201 and buffer subsystem 205 might access the same cache data structures, BAM 215 includes an arbiter to arbitrate between the first and second control sequencers to guarantee access to cache entries. BAM 215 might be employed to perform cache lookup for a command to enhance performance or to process a command and generate a thread of contexts for that command. BAM 215 might also be employed to perform buffer allocation for a context or to modify fields in a context. Thus, BAM 215 provides flexibility in manipulating context threads, generating individual contexts, and allocating cache data in the buffer. BAM 215 will be described in greater detail with regard to FIG. 6.

As described herein, embodiments of the present invention provide a media controller, 104, that supports one or more host interface protocols (e.g., SATA, SAS, etc.), by allowing for modifications of host LLD 202, without substantially affecting other modules of media controller 104. For example, as will be described herein, one implementation of Host LLD 202 might be employed for a media controller operating in accordance with the SAS protocol, and another implementation of Host LLD 202 might be employed for a media controller operating in accordance with the SATA protocol, while both implementations of Host LLD 202 might employ substantially similar implementations of other modules, such as host layer 214, buffer subsystem 205, media subsystem 209 and infrastructure subsystem 213.

Similarly, embodiments of the present invention provide media controller 104 that supports one or more media types (such as HDD, or NAND Flash SSD, hybrid magnetic and solid state drives, etc.), by allowing for modifications of Media LLD 212 without substantially affecting other modules of media controller 104. For example, as will be described herein, one implementation of Media LLD 212 might be employed for a media controller employing an HDD, and another implementation of Media LLD 212 might be employed for a media controller employing an SSD, while both implementations of Media LLD 212 might employ substantially similar implementations of other modules, such as buffer subsystem 205, media layer 210, host subsystem 201 and infrastructure subsystem 213.

As described herein, embodiments of media controller 104 support one or more different performance levels. For example, media controller 104 might have higher or lower performance requirements depending on the intended use of the media controller. The type of processors employed on the SoC, or the number of processors employed on the SoC, might change according to the performance requirements. For example, a lower performance media controller (e.g., a SATA desktop SSD) might employ a single ARM Cortex M3 processor, while a higher performance media controller (e.g., a SAS enterprise SSD) might use multiple ARM Cortex R4 processors. For example, as will be described herein, one implementation of Infrastructure Layer 214 and Infrastructure LLD 216 might be employed for a lower performance media controller, and another implementation of Infrastructure Layer 214 and Infrastructure LLD 216 might be employed for a higher performance media controller, while employing substantially similar implementations of other modules.

Table 2 shows an exemplary description of the functions of each of the high level and low level modules of media controller 104, as shown in FIG. 2:

TABLE 2

| Media Controller Module | Functions |
|---|---|
| Host Layer | host interface specific command handlers<br>host interface specific protocol checking<br>host command scheduling and routing<br>host interface specific high level error and exception handling |
| Host LLD | control of host-side data transfers<br>parse host commands to host layer<br>transfer of command status/command completion<br>handling/reporting of low level host interface specific errors and exceptions |
| Buffer Layer | read/write handling and data flow management<br>cache and buffer management, allocation/de-allocation<br>command handling for commands common to multiple media and/or host types |
| Buffer LLD | memory-specific physical layer<br>buffer controller hardware configuration/initialization |
| Media Layer | if media = SSD: Flash logical-to-physical translation, wear leveling, garbage collection, bad block management, error recovery.<br>if media = HDD: HDD logical to physical translation, low level disk read/write, defect management, servo control, channel control, error recovery. |
| Media LLD | if media = SSD: low level flash read/write/erase<br>if media = HDD: same as media layer |
| Infrastructure Layer | Operating System wrapper layer<br>Real-time Operating System/Operating System |
| Infrastructure LLD | processor subsystem initialization and boot<br>inter-processor communication & inter-task messaging protocol<br>processor peripheral control (timers, interrupts, ports)<br>serial port protocol layer (debugging, firmware updates, etc.) |

Figure 3:
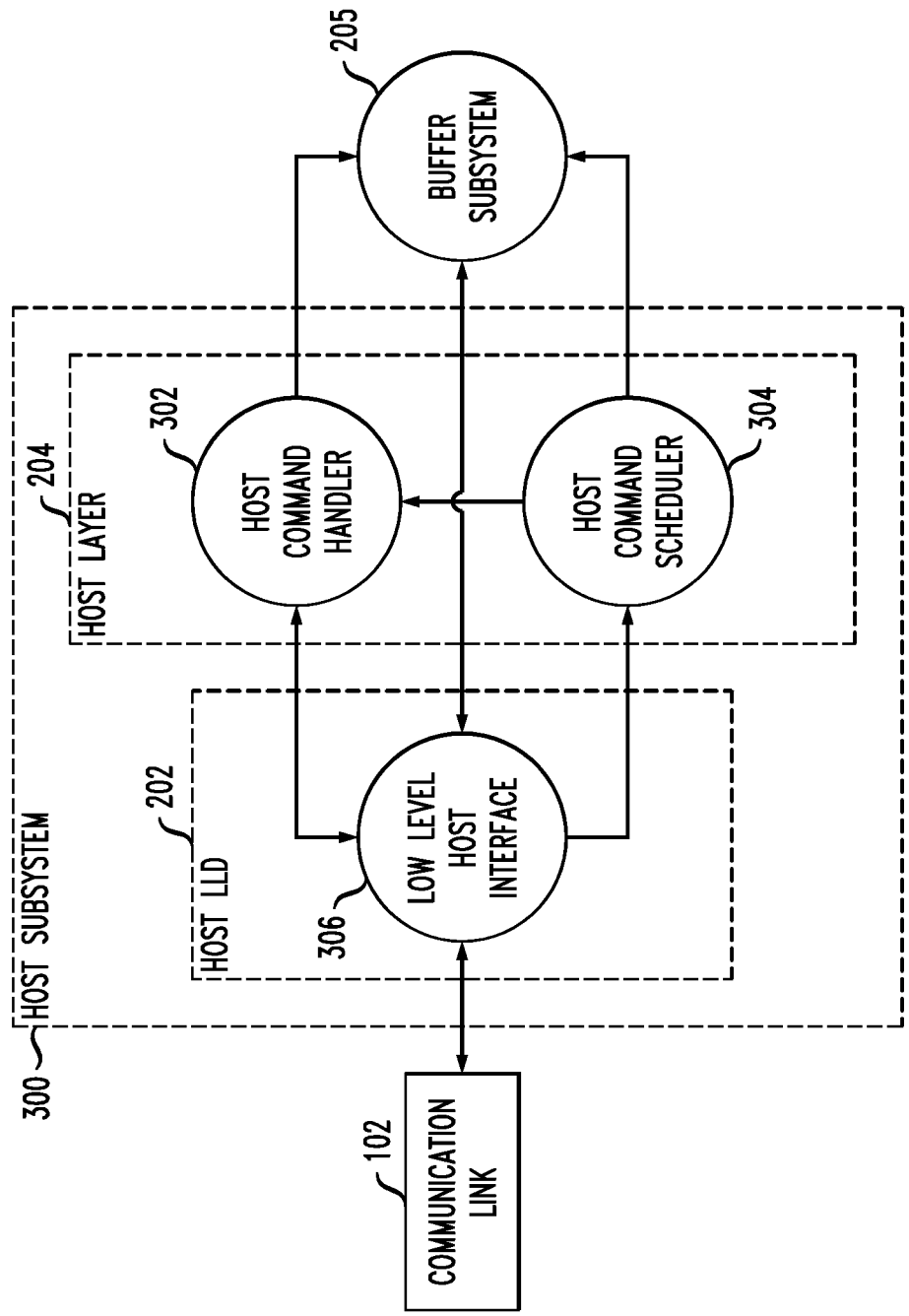
FIG. 3 shows an exemplary block diagram of the host subsystem of FIG. 2.

FIG. 3 shows an embodiment of host subsystem 201 of FIG. 2, shown as host subsystem 300. As shown in FIG. 3, host subsystem 300 is coupled to communication link 102 and buffer subsystem 205. Host subsystem 300 includes Host LLD 202 and Host Layer 204. Host LLD 202 includes Low Level Host Interface 306, and Host Layer 204 includes Host Command Handler 302 and Host Command Scheduler 304. Low Level Host Interface 306 is in communication with buffer subsystem 205. For example, data might be provided between buffer subsystem 205 and Low Level Host Interface 306 for read and write operations. As shown, Low Level Host Interface 306 is also in communication with Host Command Handler 302 and Host Command Scheduler 304. For example, when a command is received by Low Level Host Interface 306 from communication link 102, Low Level Host Interface 306 might provide the received command to Host Command Handler 302, and Low Level Host Interface 306 might provide an indication corresponding to a received command to Host Command Scheduler 304.

As described herein, Low Level Host Interface 306 might generally provide a hardware abstraction layer ("HAL") for a specific host interface protocol. Host Command Handler 302 might perform high level functionality of host commands other than read and write commands, for example, Host Command Handler 302 might send or receive device status data via Communication Link 102. Host Command Scheduler 304 might schedule received commands for processing by media controller 104 according to host-specific queuing rules, and might handle command exception conditions. Each of modules 302, 304 and 306 might have unique implementations for each host interface type (e.g., SATA, SAS, etc.). Buffer subsystem 205 might generally perform read and write commands such as described in related U.S. patent application Ser. No. 12/643,471, filed Dec. 21, 2009.

Figure 4:
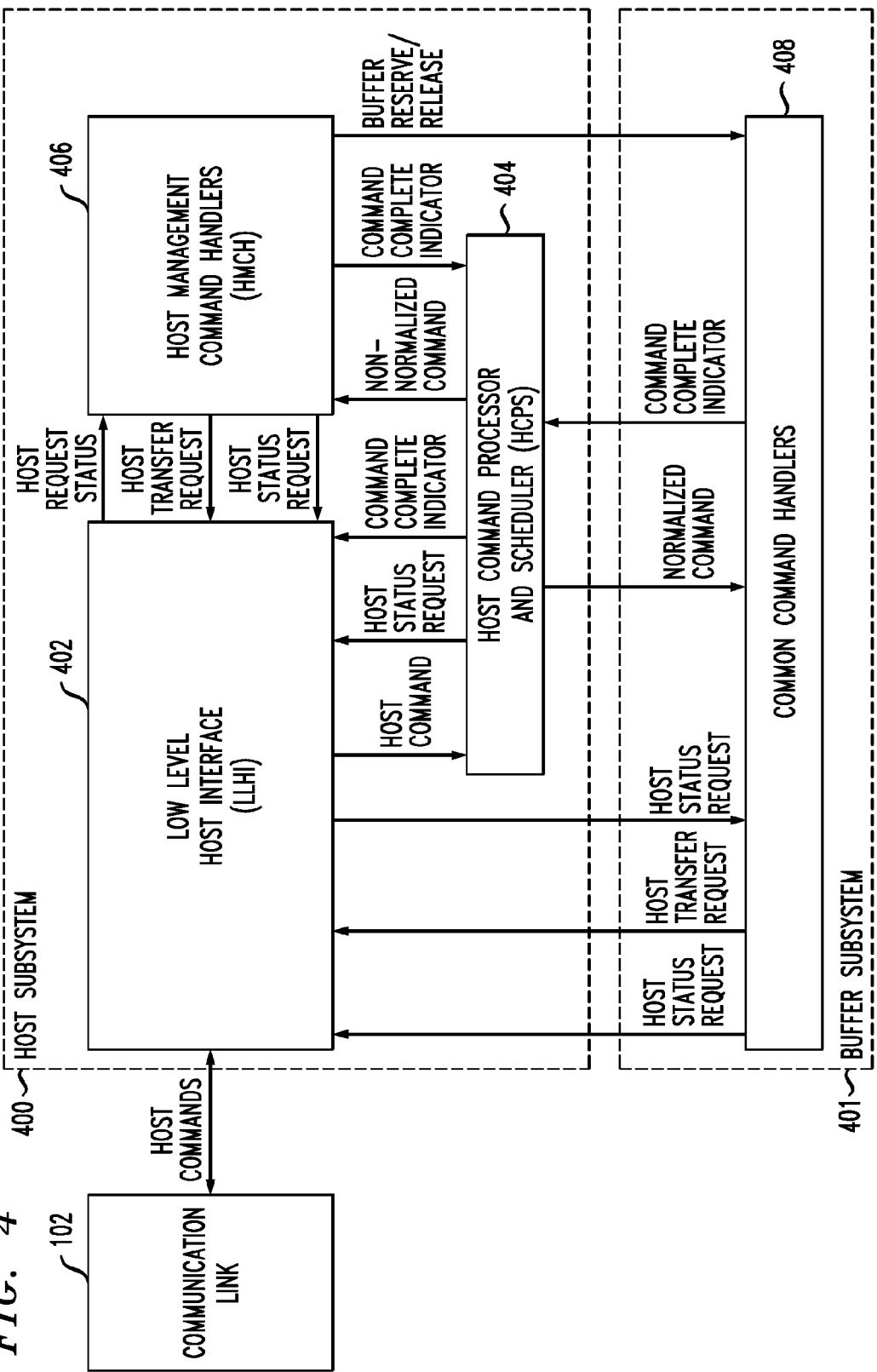
FIG. 4 shows another exemplary block diagram of the host subsystem of FIG. 2.

FIG. 4 shows an exemplary embodiment, 400, of host subsystem 300 of FIG. 3. As shown in FIG. 4, host subsystem 400 might include: i) Low Level Host Interface (LLHI 402), ii) Host Command Processor and Scheduler (HCPS 404), and iii) Host Management Command Handler (HMCH 406). Buffer subsystem 401 might include Common Command Handler (CCH) 408. CCH 408 might generally process read/write operations to/from media 118 (not shown in FIG. 4). LLHI 402 interacts directly with host hardware (e.g., communication link 102 of FIG. 1) and provides a level of hardware abstraction for host layer 204. LLHI 402 might generally be configured specifically for each host interface type (e.g., SATA, SAS, etc.). Although employing low level drivers configured specifically for each type, LLHI 402 provides similar functionality for each type of host interface. For example, LLHI 402 might provide a substantially similar API for other modules of host subsystem 201, regardless of which host interface is employed.

For example, LLHI 402 might perform hardware initialization of communication link 102, receive and parse commands from a host initiator (e.g., a SAS host device coupled to communication link 102), and process transfer and status requests. LLHI 402 might also build a command table and other data structures for command parsing. When LLHI 402 receives a command, LLHI 402 might check to see if the command can be parsed, and determine the mode of the requested data transfer. For example, a data transfer might be an LBA based host transfer, or some other type of transfer. LLHI 402 then might pass the parsed command to HCPS 404. LLHI 402 might also send status updates back to the host for a received command (for example, indicating that the command has completed). LLHI 402 might also interface with buffer allocation manager (BAM), for example BAM 215 of FIG. 2.

HMCH 406 processes the high-level host commands for each host interface. For example, HMCH 406 might validate command specific input, manage buffer resources, and manage command data transfers and status responses. For example, the high-level host commands for a SATA host are the ATA command set, and a SAS host uses the SCSI command set. HCMH 406 normalizes the host interface specific read/write type commands (e.g., SATA specific commands) to a common format that is generally employed by media controller 104. Thus, other process modules of media controller 104 (e.g., buffer subsystem 205, media subsystem 209, etc.), do not process host-specific commands. For example, commands that HCMH 406 might normalize to a common format might include the SATA power management commands (e.g., IDLE, STANDBY, SLEEP), while commands that HCMH 406 processes by a host-specific handler might include commands to perform device diagnostics, identify the device, etc. HCMH 406 might generally include a command handler corresponding to all commands supported in the protocol (e.g., SATA, SAS, etc.) that are not normalized to a common format.

Normalized commands result in a command structure that is a single format for multiple format of input commands. For example, in SCSI, there are six-, ten-, twelve-, sixteen-, and 32-byte commands. Each of these sizes has a read and write command type. A normalized command contains common fields in a fixed format, for example, a 64-bit field for LBA and a 32-bit field for transfer length. A six-byte SCSI read command would, for example, have its one-byte transfer length "normalized" into the 32-bit transfer length field of the normalized command and its 21-bit LBA "normalized" into the 64-bit LBA field of the normalized command.

The command handlers of HMCH 406 employ APIs to communicate with LLHI 402 to receive or send data and status information from or to a host device coupled to communication link 102. For example, the SCSI MODE SELECT command handler might use a host data transfer API to receive additional parameters from a host that are transferred separately from the initial host command. As another example, the ATA IDENTIFY DEVICE command handler might use the host data transfer API to send the IDENTIFY DEVICE data to the SATA host. All of the non-read/write command handlers might use send status API to indicate that a command has completed.

For example, as shown in FIG. 4, HMCH 406 might send a host transfer request to receive additional parameters from a host that are transferred separately from the initial host command. HMCH 406 might send a host status request signal to LLHI 402 to indicate that a corresponding command is complete. LLHI 402 might send a host request status back to CCH 408. For example, if CCH 408 requests a data transfer, LLHI 402 will respond with an indication that the transfer reached completion. If CCH 408 requests a status, LLHI 402 will respond with an indication of status. As shown, similar signals might also be communicated between CCH 408 and LLHI 402. As described, a host command is received by LLHI 402, which performs initial checks on the received command LLHI 402 then provides received commands to HCPS 404. As shown, HCPS 404 might provide normalized commands to CCH 408, and might provide non-normalized commands to HMCH 406. CCH 408 and HMCH 406 might provide an indicator to HCPS 404 when a command is complete.

HCPS 404 generally manages host subsystem 400. HCPS 404 might validate commands, schedule command processing, route commands, complete commands, perform command error handling, and manage commands. HCPS 404 processes each host command (plus "abort" and "exception" conditions) received from LLHI 402. A unique but architecturally similar firmware implementation of HCPS 404 might desirably be employed for each host interface type. Functions performed by the HCPS include i) host interface specific protocol checking, ii) command queuing rules, iii) scheduling host command handler execution and iv) command aborts and exception handling Embodiments of HCPS 404 employ a protocol checking function that scan for cases that may inhibit command execution. For example, for the SCSI protocol, a Unit Attention Condition following a power-on or SCSI reset might prevent commands for executing. Similarly, for the ATA protocol, the locked or frozen security modes might prevent commands from executing. HCPS 404 also detects unsupported or invalid commands ("exceptions").

HCPS 404 enforces command queuing rules of the host interface. For example, any received SCSI command with an ORDERED queue tag is queued until all commands received previously are completed. Commands received subsequently are also queued until the ORDERED command is completed. HCPS 404 checks for illegal queuing conditions, such as, for example, the receipt of a non-queued ATA command while other native queued read/write commands are still executing. After completing the appropriate host interface protocol and command queuing checks, HCPS 404 adds the command to its internal command queue. A received command that is not queued might become active and scheduled for execution when it is received. For example, all read/write commands that pass the protocol and queuing checks are immediately passed to CCH 408. CCH 408 might process, and reorder if necessary, one or more active read/write commands.

However, other received commands might not immediately be scheduled for execution. For example, non-read/write commands usually become active when they sent to the corresponding command handler, based on their command opcode, in HCMH 406. In some embodiments, only one non-read/write command is allowed to become active and executed in the system at one time (e.g., ATA devices). For SCSI devices, since command queuing is allowed for non-read/write commands, embodiments of the present invention might process non-read/write SCSI commands having a SIMPLE queue tag as if they were SCSI commands having an ORDERED queue tag (i.e. the commands are scheduled and executed one at a time in the order in which they were received).

As described, CCH 408 and HCMH 406 might provide a command complete indication to HCPS 404 when the execution of a command has completed. HCPS 404 might then remove the completed command from the command queue. When a command is completed, HCPS 404 also determines if the completed command was causing one or more other commands to be "blocked" in the system command queue, such as described in related U.S. patent application Ser. No. 12/649, 940, filed Dec. 30, 2009. If a command was blocked, the blocked command is provided to the appropriate command handler (e.g., one of CCH 408 and HCMH 406) for execution.

In summary, HCPS 404 generally i) schedules a received read/write command for immediate execution and passes it on to CCH 408 in buffer subsystem 401, ii) schedules a received non-read/write command for immediate execution (if no other command is active) and passes it on to the corresponding non-read/write command handler in HCMH 406 based on the command opcode, iii) queues the received command and defers command execution until later (e.g., due to SCSI command queuing rules), or iv) ends the command with an error status due to failing a host interface protocol check, a command queuing rules check, or due to an invalid command.

Figure 5:
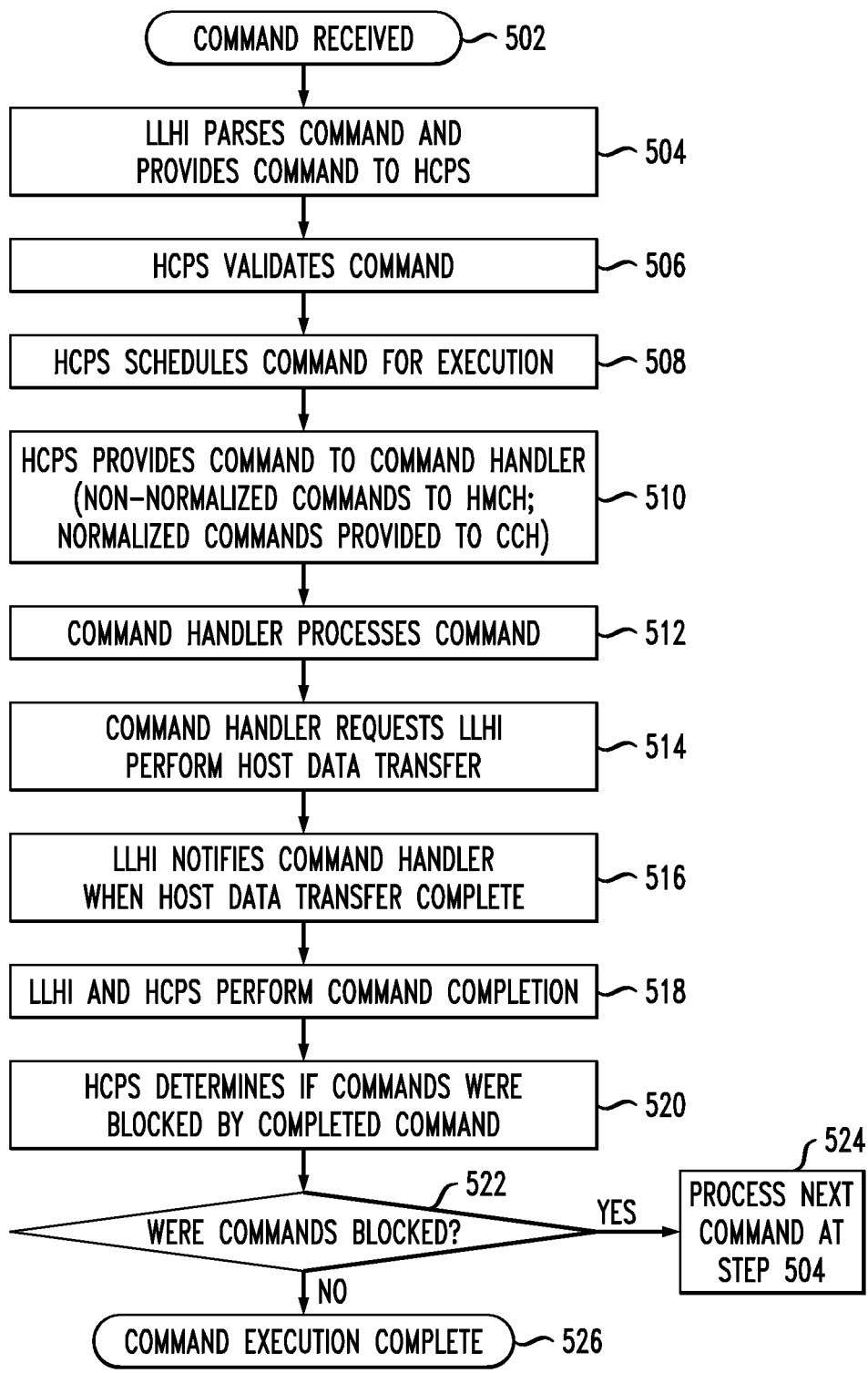
FIG. 5 shows an exemplary flow diagram of the operation of the host subsystem of FIG. 4.

FIG. 5 shows an exemplary flow diagram of command execution process 500, which is performed by host subsystem 400 of FIG. 4 to execute a valid host command. As shown in FIG. 5, at step 502, a command is received by host subsystem 400. At step 504, LLHI 402 parses the received command and provides the command to HCPS 404. At step 506, HCPS 404 validates the command, and at step 508, HCPS 404 schedules the command for execution. As described herein, the command alternatively might be queued for later execution by HCPS 404 when one or more previous commands complete. If the command is not queued, at step 510, HCPS 404 provides the command to its appropriate corresponding command handler. For example, as described herein, read and write commands might be provided to CCH 408, while other commands might be provided to HMCH 406. At step 512, the corresponding command handler of one of CCH 408 and HMCH 406 processes the command. At step 514, the command handler requests that LLHI 402 perform the host data transfer corresponding to the received command.

At step 516, LLHI 402 provides a notification to the command handler when the host data transfer is complete. At step 518, LLHI 402 and HCPS 404 perform command completion tasks, such as, for example, releasing buffer space, recycling data structures and pointers, and removing the completed command from command queues. At step 520, HCPS 404 determines if any queued commands were blocked by the completed command. If, at step 522, one or more queued commands were blocked by the completed command, at step 524, command execution process 500 might return to step 504 to execute the one or more queued commands. If, at step 522, no commands were blocked by the completed command, command execution process 500, command execution process 500 might be complete at step 526.

As described in regard to FIG. 2, embodiments of the present invention might offload at least part of the workload of host subsystem 201 to a programmable sequencer, which might facilitate efficient performance by providing for scatter-gather operations and by employing parallel processing and balancing the workload between the host processor firmware and the programmable sequencer. For example, as shown in FIG. 2, host subsystem 201 might be in communication with buffer allocation manager (BAM) 215. BAM 215 might be implemented as a programmable sequencer, such as a set of programmable registers in communication with a controller having a small instruction set to modify data in the programmable registers. BAM 215 is coupled to host subsystem 201 and buffer subsystem 205. BAM 215 might be employed to provide acceleration and flexibility in managing the cache and the transfer of information between host subsystem 201 and buffer subsystem 205.

BAM 215 might maintain cache management data describing data blocks stored in the cache, such as the status of data blocks stored in the cache (e.g., valid, dirty, etc.), the address of that data, and which modules of media controller 104 are accessing the data. BAM 215 might also aid with host context generation. As described herein, a context is generally a data structure used within media controller 104 that specifies the information necessary to send or receive data (e.g., information necessary to i) generate and send a data frame or frame information structure (FIS) on communication link 102, ii) perform direct memory access (DMA), etc.).

Figure 6:
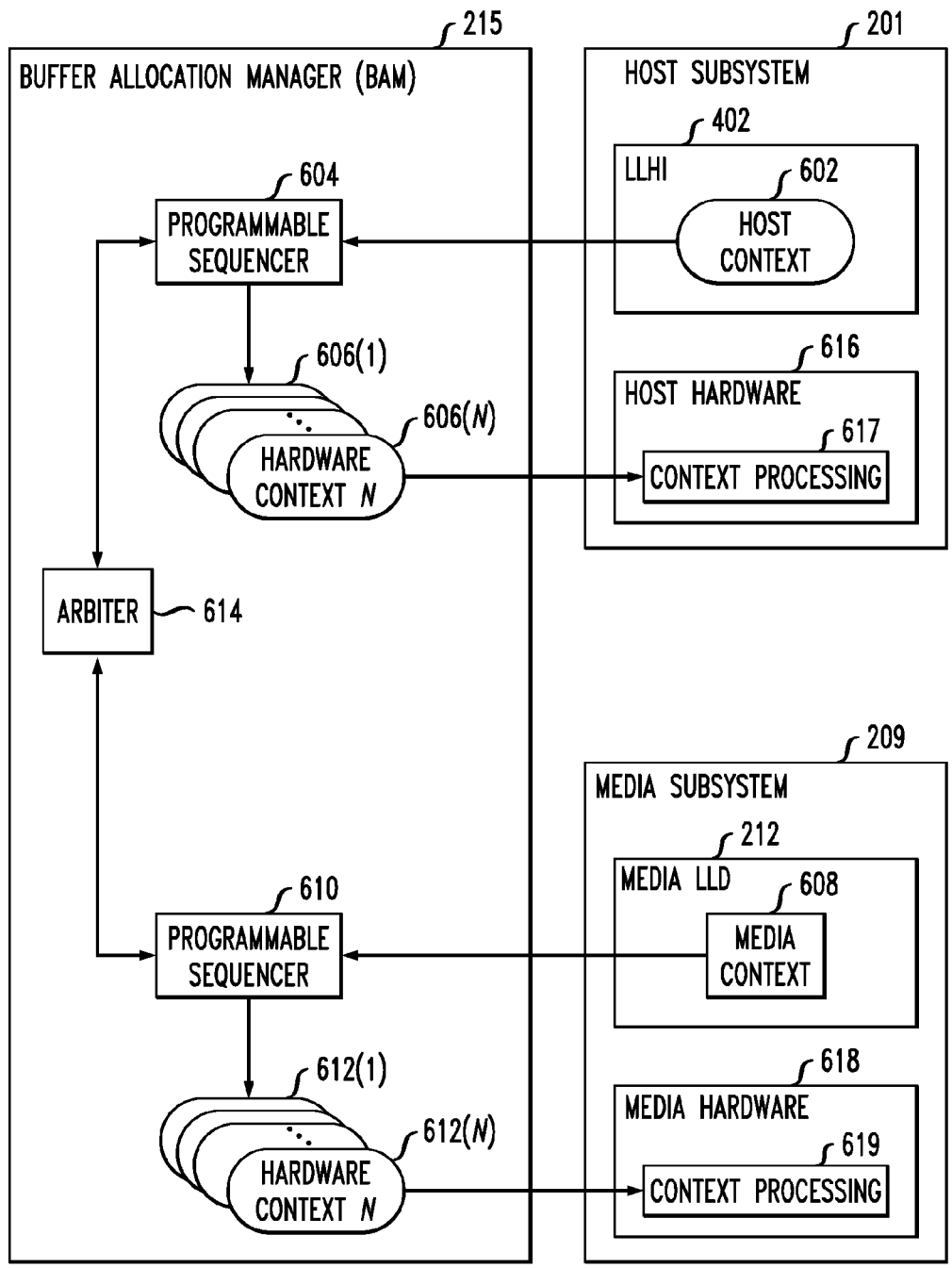
FIG. 6 shows an exemplary embodiment of the buffer allocation manager (BAM) of FIG. 2.

As shown in FIG. 6, BAM 215 might be employed to generate a thread of contexts for a received host command. BAM 215 might also be employed to perform buffer allocation for a context or to modify fields in a context. As shown in FIG. 6, BAM 215 might generally include i) a first control sequencer 604 for host command and context processing and ii) a second control sequencer 610 for media command and context processing. Since both host subsystem 201 and media subsystem 209 might access the same cache data structures, BAM 215 might include arbiter 614 to arbitrate between the first and second control sequencers to guarantee access to cache entries.

As shown in FIG. 6, host subsystem 201, particularly LLHI 402, might generate a host context, 602. Host context 602 is generated when a data transfer is required from host subsystem 201 to media 118 via buffer subsystem 205, such as when a host write operation is received by media controller 104. Host context 602 corresponds to a starting address (for example a starting LBA of media 118, or a starting buffer address of at least one of RAM buffers 112 and 114) and a length (for example an amount of data included in the context). In embodiments of the present invention, a sequencer context might generally correspond to a transfer request for one or more data chunks corresponding to the overall length of the host transfer. Host context 602 is provided to programmable sequencer 604, which generates hardware contexts 606(1)-606(N) corresponding to host context 602. For example, if host context 602 corresponds to a data transfer of 4 noncontiguous chunks, programmable sequencer 604 might generate 4 hardware contexts (e.g., one context for each corresponding noncontiguous chunk). Hardware contexts 606(1)-606(N) are provided to context processing module 617 of host hardware 616. By employing programmable sequencer 604 to program one or more host hardware contexts from a single host context, host subsystem 201 is free to perform other tasks while sequencer 604 generates the host hardware contexts and provides the hardware contexts to context processing module 617. Context processing module 617 might, for example, provide direct memory access (DMA) to transfer data corresponding to hardware contexts 606(1)-606(N) between a host device and at least one of media 118, buffer 112 and buffer 114.

Similarly, media subsystem 209 might generate media context 608. Media context 608 is generated when a data transfer is required from media subsystem 209 to communication link 102 via buffer subsystem 205, such as when a host read operation is received by media controller 104. Programmable sequencer 610 might generate one or more hardware contexts 612(1)-612(N) corresponding to host context 608. Arbiter 614 arbitrates between programmable sequencers 604 and 610 for access to data cached in the buffer. Hardware contexts 612(1)-612(N) are provided to context processing module 618 of media subsystem 209.

By employing programmable sequencer 610 to program one or more media hardware contexts from a single media context, media subsystem 209 is free to perform other tasks while sequencer 610 generates the media hardware contexts and provides the hardware contexts to context processing module 619 of media hardware 618. Context processing module 619 might, for example, provide direct memory access (DMA) to transfer data corresponding to hardware contexts 612(1)-612(N) between media 118 and at least one of buffer 112 and buffer 114. Thus, embodiments of the present invention, such as shown in FIG. 6, improve the overall host system performance by using programmable sequencers to generate one or more contexts from a single higher level context (e.g., 602 and 608). The parallel sequencers allow for media-side operations and host-side operations to be performed in parallel, such as described in related U.S. patent application Ser. No. 12/731,631, filed Mar. 25, 2010.

As described with regard to FIG. 6, embodiments of the present invention provide that a single host data transfer (e.g., a single data transfer request received from a host device coupled to communication link 102) might correspond to one or more data transfer contexts for data transfers internal to media controller 104. Data related to a single host data transfer might be scattered in different locations in media 118 or at least one of buffers 112 and 114, yet need to be combined into a single contiguous data transfer to the host device coupled to communication link 102. Thus, embodiments of the present invention allow a protocol command to be split into one or more contexts that can later be recombined into one host data transfer. Splitting a host command into one or more corresponding contexts allows decoupling of host data transfer boundaries (e.g., host frame size) from data transfer boundaries for media controller 104 (e.g., chunk size) and the overall size of the data transfer. Thus, the size of internal data contexts of media controller 104 might be selected without dependence on the size of data frames transferred over communication link 102 and the total size of the transfer.

Splitting a host command into one or more corresponding contexts might also accommodate multiple buffer management techniques and multiple protocol techniques, such as, for example, SATA programmed input/output (PIO) multiple commands and SAS multiple pending write commands. PIO Multiple commands include data transfers for one or more memory addresses, where the alignment of the data in the PIO Multiple command generally does not line up to a boundary of media controller 104. Thus, embodiments of the present invention might beneficially split PIO Multiple commands into one or more contexts that align to chunk boundaries of data stored by media controller 104, for example, data stored in media 118 or buffers 112 and 114.

Figure 7:
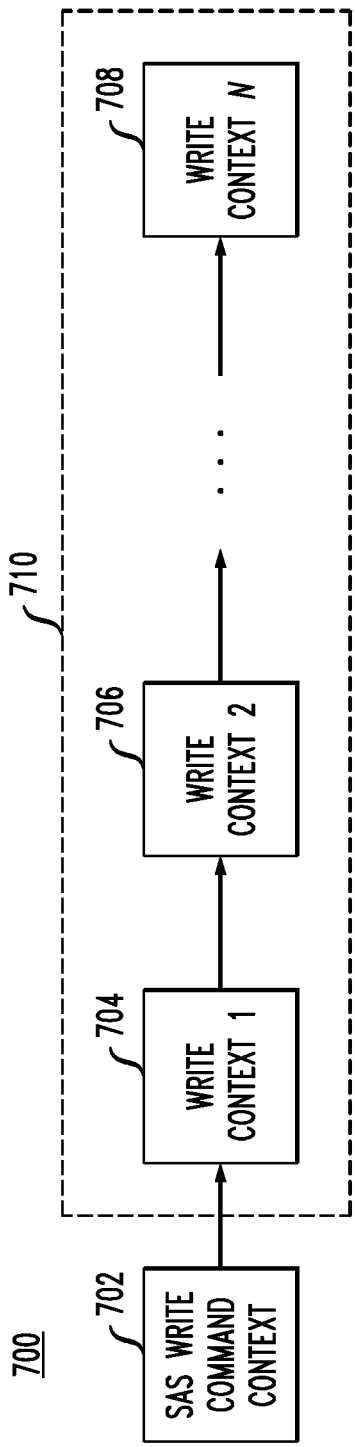
FIG. 7 shows a block diagram of exemplary protocol commands and the associated contexts for a write data transfer in a media controller operating in accordance with exemplary embodiments of the present invention.

FIG. 7 shows a block diagram of exemplary protocol command contexts and the associated data contexts for a write command in conformance with the SAS protocol. As shown in FIG. 7, a SAS write command might be split into a command context (702) and one or more write contexts (704-708), to provide scatter-gather buffer management support. For example, for a SAS write operation, SAS command context 702 might correspond to the TRANSFER READY frame in accordance with the SAS protocol. The TRANSFER READY frame generally enables write transfers from a source to media controller 104. In embodiments of the present invention, multiple write transfers might be active at a time. In response to the TRANSFER READY frame, command context 702 is generated and generally corresponds to the total amount of data that can be received for the write data command. For example, the command context might be sized appropriately for meeting the link requirements such as maximum burst size while also dividing write commands into appropriately sized pieces for internal transfers.

As shown in FIG. 7, command context 702 might correspond to one or more write contexts 704-708 that are generated to process the data transfer. The size of write contexts 704-708 might correspond to chunk boundaries of data stored by media controller 104, for example, data stored in media 118 or buffers 112 and 114. The chunk boundaries are independent of the protocol frame boundaries and the overall size of the transfer. A counter might be employed to track the number of chunk boundaries such that a new data transfer context can be processed without affecting the other contexts. As shown in FIG. 7, command context 702 (corresponding to the SAS TRANSFER READY frame) corresponds to write contexts 704-708, as indicated by the dashed line. Write contexts 704-708 provide address information for the data to be transferred (e.g., the address in at least one of buffers 112 and 114) corresponding to one or more chunks of command context 702. In embodiments of the present invention, each of write contexts 704-708 have the same configuration options, and the total length of write contexts 704-708 matches the overall data length provided in command context 702. As described with regard to FIG. 6, write contexts 704-708 might be processed by context processing module 616 of host subsystem 201.

Figure 8:
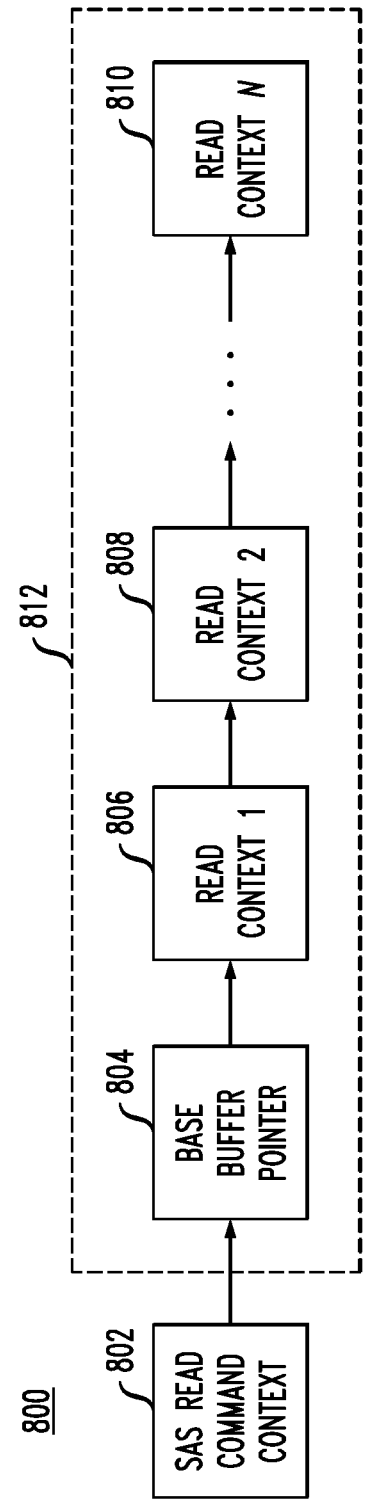
FIG. 8 shows a block diagram of exemplary protocol commands and the associated contexts splits for a read data transfer in a media controller operating in accordance with exemplary embodiments of the present invention.

FIG. 8 shows a block diagram of exemplary protocol command contexts and the associated data contexts for a read data transfer in conformance with the SAS protocol. As shown in FIG. 8, command context 802 corresponds to the SAS read command and generally corresponds to the total data transfer size. As shown in FIG. 8, command context 802 might correspond to one or more read contexts 806-810 that are generated to process the data transfer. As indicated by the dashed line, the one or more read contexts 806-810 might be joined into single host data transfer 812. The size of read contexts 806-810 might correspond to chunk sizes of data stored by media controller 104, for example, data stored in media 118 or buffers 112 and 114. A context count for read contexts 806-810 might be maintained separately from a host frame count so the context boundaries are independent of the frame boundaries.

As described above, the one or more read contexts 806-810 are optional, as embodiments of the present invention might, depending on the size of the read data transfer or settings of media controller 104, employ varying context boundaries. For example, for small read operations, only a single context per protocol command might be employed (e.g., only read command context 802). In this case, a single context is generated for the data transfer. Alternatively, as described previously, multiple data transfer contexts might be merged together into one host data transfer. As shown in FIG. 8, read command context 802 corresponds to the host command length and one or more read contexts 806-810 that satisfy the overall instruction length. Protocol frame boundaries are maintained independently of context boundaries, so frames of the maximum size allowed by the link protocol might be sent until all of read contexts 806-810 have been processed.

As shown in FIG. 8, read command context 802 is generated and defines the entire data transfer length of the protocol instruction request, but this context might reference a context structures accessible by BAM 215, or one or more contexts stored in buffer subsystem 205. In embodiments of the present invention, base buffer pointer 804 is optional. Base pointer 804 might generally provide a single context in buffer subsystem 205 for a transfer, while contexts 806-810 might be generated by BAM 1602152, as shown in FIG. 6. BAM 215 might generate and store data corresponding to read contexts 806-810. Contexts 806-810 are provided to communication link 102 as a host data transfer. Thus, embodiments of the present invention provide the ability to generate contexts for a data transfer command in three ways, while supporting the maximum host transfer size: i) in a single context for the command and the data transfer in buffer subsystem 205 (e.g., context 802 without any other contexts); ii) a command context (e.g., context 802) with a single data transfer context in buffer subsystem 205 (e.g., base pointer 804) that corresponds to one or more data transfer entries in BAM 215 (e.g., contexts 806-810); and iii) one or more contexts in buffer subsystem 205, split between a command context (e.g., 802) and one or more data contexts (e.g., 804-808).

Thus, as described herein, embodiments of the present invention provide that at least part of a host subsystem workload might be offloaded to a programmable sequencer. The programmable sequencer might facilitate efficient performance by employing parallel processing and balancing the workload between the host subsystem and the programmable sequencer. Further, embodiments of the present invention might allow a host protocol command to be split into one or more contexts that might be recombined into one host data transfer. Splitting a host command into one or more contexts allows decoupling of host data transfer boundaries (e.g., host frame size) from data transfer boundaries (e.g., chunk size) and the overall size of the data transfer. Thus, the size of internal data contexts of a media controller might be selected without dependence on the size of host protocol data frames transferred or the total size of the transfer.

Figure 9:
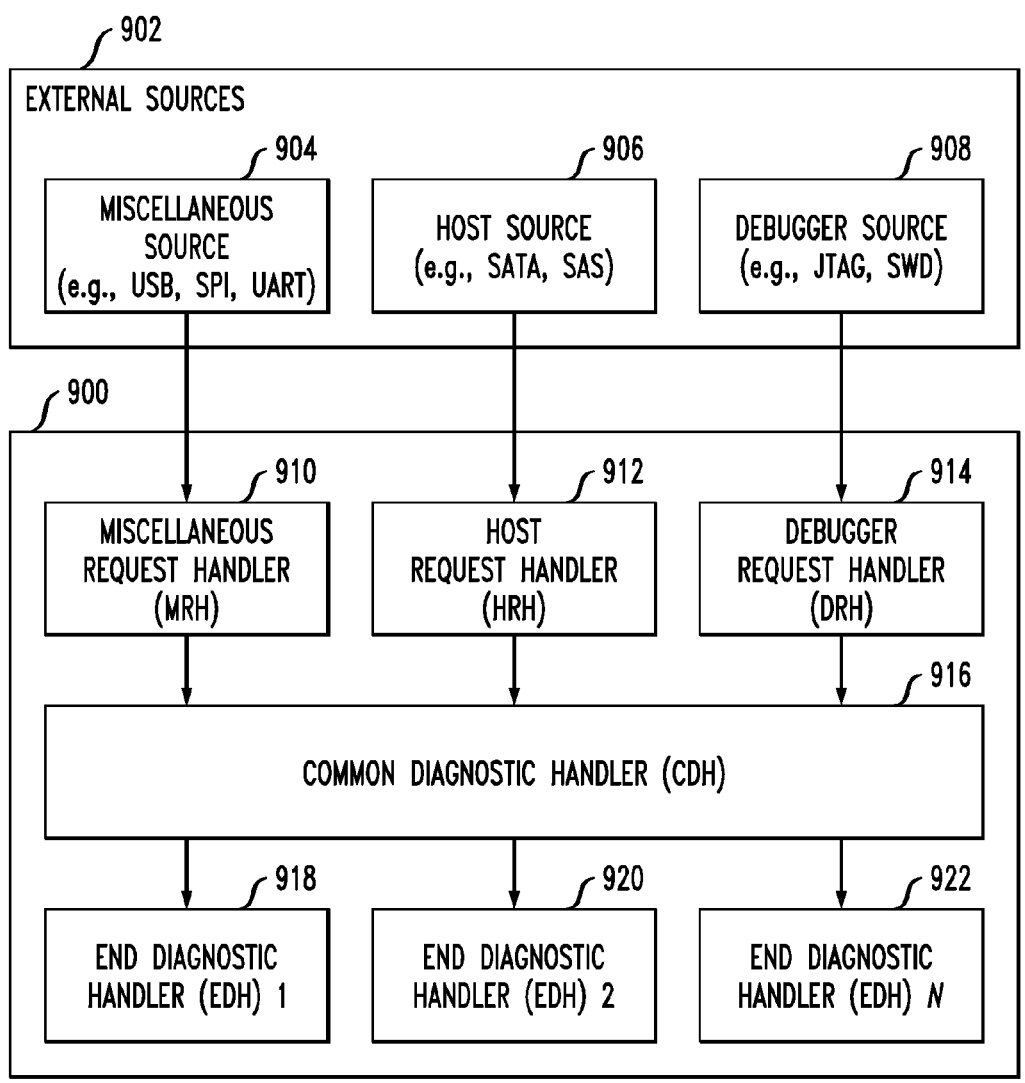
FIG. 9 shows an exemplary block diagram of a diagnostic subsystem of the memory storage system of FIG. 1 operating in accordance with embodiments of the present invention.

FIG. 9 shows a block diagram of diagnostic subsystem 900 of media controller 104. Diagnostic subsystem 900 might process diagnostic requests from one or more diagnostic sources, perform some common handling, and route the diagnostic request to a corresponding end diagnostic handler (EDH), shown as exemplary EDHs 918-922. As described herein, diagnostic requests typically perform a specific task to debug device problems. For example, diagnostic requests might read or write a register, perform a test, or report device status data. Diagnostic requests might originate from many different source types, shown as external sources 902. For example, a diagnostic request might originate from i) host source 906 (e.g., SATA, SAS, etc. devices coupled to communication link 102) ii) debugger source 908, e.g., a debugger operating in compliance with JTAG (Joint Test Action Group) or SWD (Serial Wire Debug), or iii) miscellaneous sources 904, e.g., SPI (Serial Peripheral Interface) or UART (universal asynchronous receiver/transmitter).

As shown in FIG. 9, diagnostic subsystem 900 is configured to receive diagnostic requests from multiple types of sources, and route the diagnostic requests to Common Diagnostic Handler (CDH) 916. Each supported external source type might have a corresponding request handler, shown as Miscellaneous Request Handler (MRH) 910, Host Request Handler (HRH) 912, and Debugger Request Handler (DRH) 914. Each corresponding request handler is a low level driver for the communications protocol corresponding to the source type. For example, HRH 912 might support one or more host types (e.g., SATA, SAS, etc.); DRH 914 might support one or more debugger types (e.g., JTAG, SWD, etc.), and MRH 910 might support one or more other request types (e.g., SPI, UART, etc.). After the corresponding request handler has received a diagnostic request and parses the command, the diagnostic request is sent to CDH 916.

CDH 916 generally manages the processing of diagnostic requests and handles aspects of diagnostic requests that are common to many diagnostics. Such aspects might include, for example, memory management and management of data transfers. CDH 916 then routes diagnostic requests to the corresponding one of EDHs 918-922. For example, each one of EDHs 918-922 might correspond to a given type of diagnostic task (e.g., memory tests, etc.). CDH 916 generally handles the complexity of processing a diagnostic request, reducing the complexity of EDHs 918-922.

Figure 10:
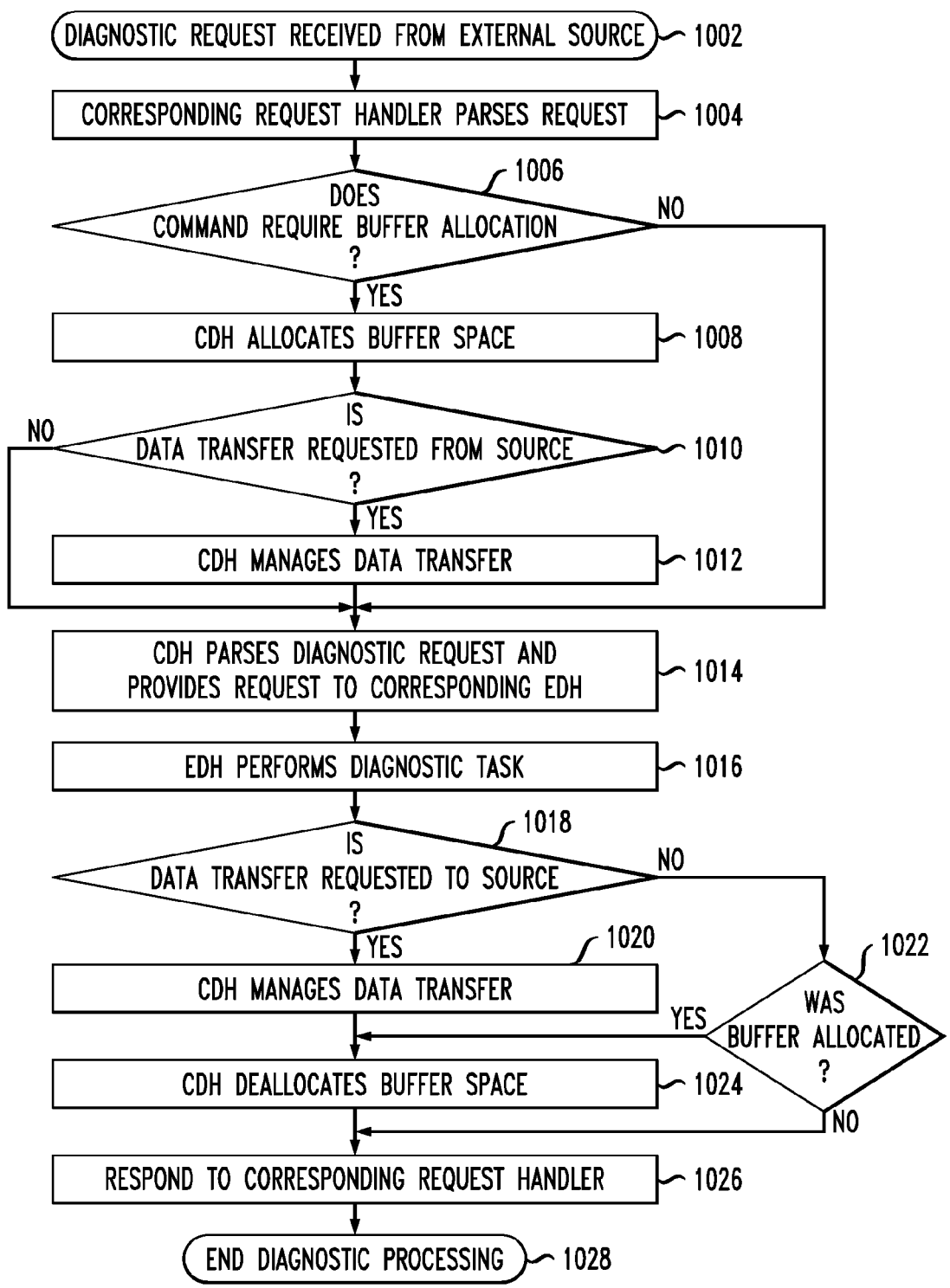
FIG. 10 shows a flow diagram of an exemplary process for executing diagnostics requests by the diagnostic subsystem of FIG. 9.

FIG. 10 shows a flow diagram of diagnostic request process 1000 as performed by diagnostic subsystem 900. As shown in FIG. 10, at step 1002, diagnostic subsystem 900 receives a diagnostic request from one of diagnostic sources 904-908. At step 1004, the corresponding one of request handlers (e.g., 910-914) parses the command and sends the command to CDH 916. At step 1006, CDH 916 determines if the diagnostic request requires buffer space (e.g., in at least one of buffers 112 and 114). If buffer space is not required, processing advances to step 1014. At step 1006, if buffer space is required, at step 1008, CDH 916 allocates buffer space for the diagnostic request in at least one of buffers 112 and 114. The allocated buffer space might be associated with the diagnostic request for the duration of the handling of the request by media controller 104, and generally be used for data transfers to or from the diagnostic source.

CDH 916 might allocate a buffer for a diagnostic even if no data transfer is associated with the diagnostic request. At step 1010, CDH 916 determines if the diagnostic request requires data to be transferred from the source of the diagnostic request to media controller 104. CDH 916 and the corresponding request handler (e.g., 910-914) initiate the transfer from the source in accordance with the source protocol requirements. If, at step 1010, the diagnostic request does require data from the source, at step 1012, CDH 916 manages the data transfer as a standard data transfer (e.g., similarly as described with regard to FIGS. 1 and 2). Once the data transfer at step 1012 is complete or, at step 1010, if no data transfer was required, processing continues to step 1014.

At step 1014, CDH 916 parses the diagnostic request and routes the diagnostic request to the End Diagnostic Handler (e.g., one of EDHs 918-922) corresponding to the diagnostic request. Part of the diagnostic request from every source is a field that indicates which component of media controller 104 the diagnostic request is directed. CDH 916 uses this field to route the diagnostic request to the appropriate EDH. At step 1016, the corresponding one of EDHs 918-922 performs the requested diagnostic operation and responds back to CDH 916 when the diagnostic request is complete. At step 1018, CDH 916 determines if a data transfer back to the source of the diagnostic request is required. For diagnostic requests that require data to be transferred to the source, at step 1020, CDH initiates and manages the transfer. When the data transfer of step 1020 completes, processing continues to step 1024.

If, at step 1018, CDH 916 determines that no data transfer is required, the process continues to step 1022. If, at step 1022, no buffer space was allocated at step 1008 to process the diagnostic request, the process continues to step 1026. If, at step 1022 there was buffer space allocated, then at step 1024 CDH 916 deallocates the buffer space allocated at step 1008 for the diagnostic request. At step 1026, CDH 916 responds back to the corresponding one of request handlers 910-914. This response includes a status of the diagnostic request, for example, indicating if there were any errors during the data transfer, CDH processing, or EDH processing of the diagnostic request. At step 1028, diagnostic request process 1000 is completed.

As described herein, some diagnostic requests might be provided to media controller 104 via miscellaneous sources such as, for example, a UART (universal asynchronous receiver/transmitter). Embodiments of the present invention provide a UART for media controller 104 employing a binary serial protocol and supporting two or more data streams interleaved on the same communication line.

Figure 11:
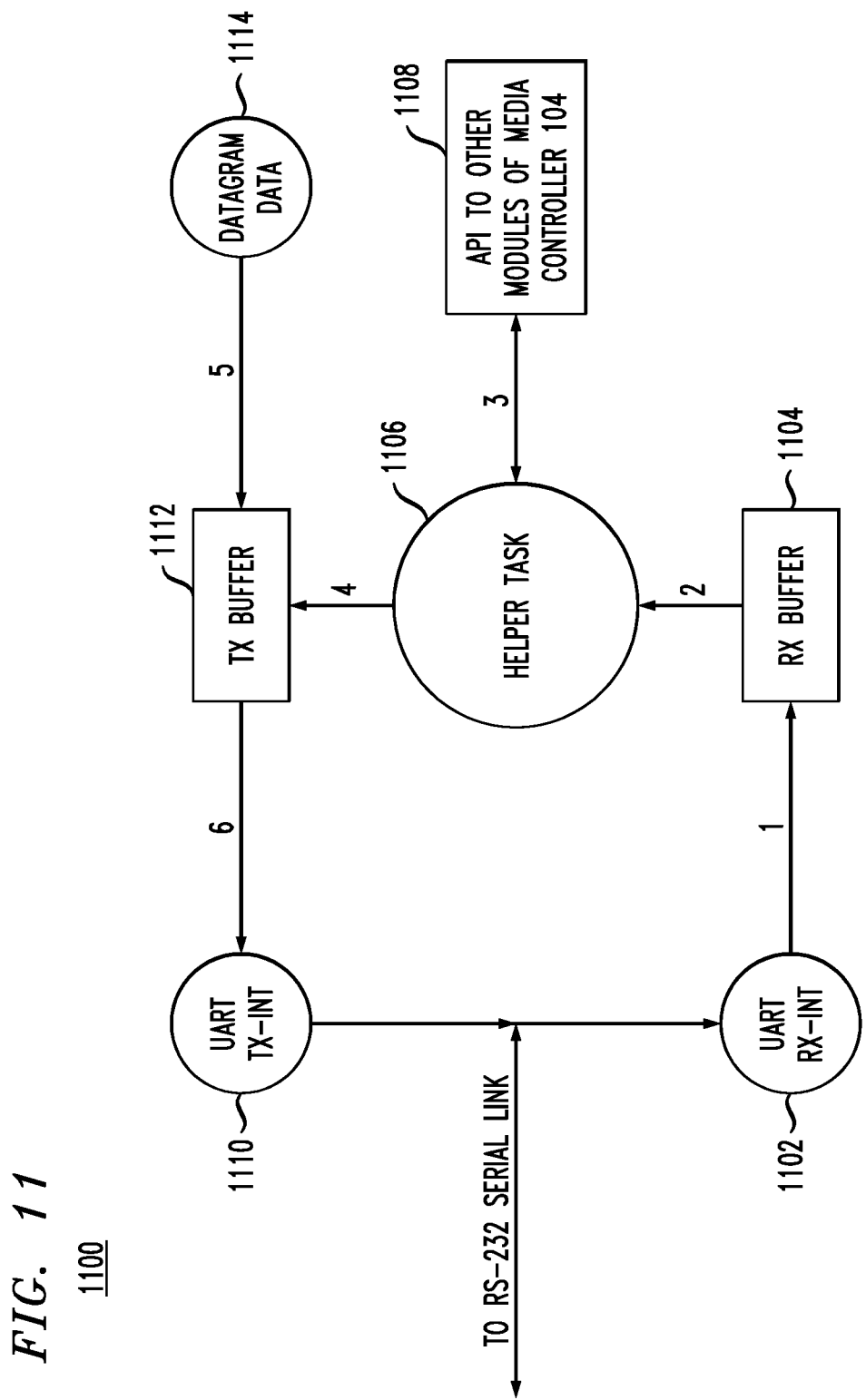
FIG. 11 shows an exemplary block diagram of the operation of a universal asynchronous receiver/transmitter (UART) as employed by exemplary embodiments of the present invention.

FIG. 11 shows a block diagram of the basic operation of UART 1100. As shown in FIG. 11, when a data byte is received by UART 1100, an interrupt process is triggered, shown as RX-INT 1102. RX-INT 1102 transfers the received serial data into RX Buffer 1104, as indicated by arrow 1. Once the command header is received into RX Buffer 1104, the command header is decoded to determine, for example, a command type.

Received commands might typically be executed outside of the interrupt (RX-INT 1102) by "helper task" 1106, as shown by arrow 2. Performing commands outside of the interrupt allows UART 1100 to process other data while the command is executing. Helper task 1106 might perform commands that consume system resources, for example reading or writing media 118. Helper task 1106 might employ API 1108 to communicate with other modules of media controller 104, as indicated by arrow 3. Response data and command status is provided to TX Buffer 1112 from helper task 1106, as indicated by arrow 4. When TX Buffer 1112 contains data ready to be sent to the RS-232 link, TX-INT 1110 is generated for UART 1100 to send the data out to the RS-232 serial link, as indicated by arrow 6. As shown, datagram data 1114 might also be provided to TX buffer 1112, as indicated by arrow 5. A multiplexer (not shown) might control access to TX buffer 1112 so that response data/status (arrow 4) and datagram data (arrow 5) are properly provided to TX buffer 1112. Datagram data and response data/status will be described in regard to FIGS. 12 and 13.

Embodiments of the present invention might provide a "reliable" application level data path (a "Command Data Transport") for issuing commands from the host and receiving responses to those commands from the embedded device.

Embodiments of the present invention might also provide an "unreliable" datagram path ("Logging Data Transport") for delivering logging type information from the device to the host.

Figure 12:
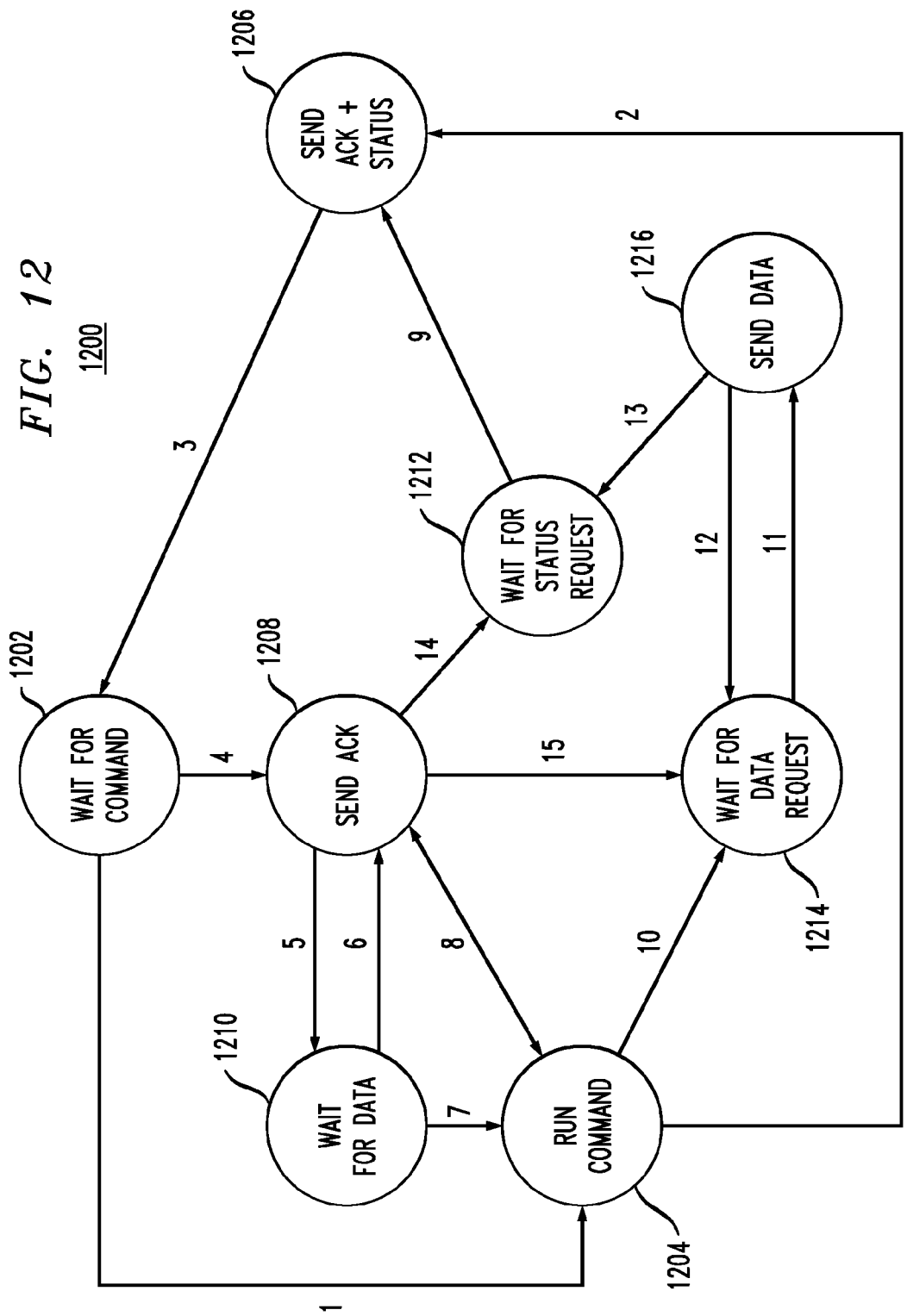
FIG. 12 shows a state diagram for the UART shown in FIG. 11, operating a Command Data Transport (CDT) protocol in accordance with exemplary embodiments of the present invention.

FIG. 12 shows a state diagram of an embedded device, such as media controller 104, operating in accordance with a Command Data Transport ("CDT") protocol. The CDT protocol is employed to issue commands from the host and receive responses to those commands from the embedded device. In embodiments of the present invention, the CDT is driven by the host device (e.g., a computer coupled to media controller 104 using an RS-232 serial link). For example, timers or timeouts might be controlled by the host device rather than UART 1100. In embodiments of the present invention, the CDT protocol implements commands to the embedded device, such as, for example: i) a "peek" command to read a designated register or memory address, ii) a "poke" command to write a designated register or memory address with specified data, iii) a "memory dump" command to read and transfer data found in a designated memory region, and iv) a "memory write" command to write a designated memory region with specific data. Embodiments of the present invention might also provide for running or stopping modules of media controller 104.

Although any number of commands might be implemented, commands generally might be classified into one of three categories: i) NO TRANSFER commands, ii) WRITE TRANSFER commands, and iii) READ TRANSFER commands. The exemplary state diagram of FIG. 12 shows processing for these command type classifications in accordance with the CDT protocol. In general, UART 1100 is waiting to receive a CDT command at state 1202. When a command is received, UART 1100 determines whether the command is a NO TRANSFER, WRITE TRANSFER, or READ TRANSFER command.

If the received command is a NO TRANSFER command, UART 1100 performs the requested command, shown as state transition 1 to state 1204. UART 1100 responds to the host device with an acknowledgement ("ACK") signal and status data indicating the status of the command, shown as state transition 2 to state 1206. Once the ACK signal and status data is sent, UART 1100 returns, as indicated by state transition 3, to state 1202 to wait to receive another command.

If the received command is a WRITE TRANSFER command, UART 1100 responds with an ACK signal, shown as state transition 4 to state 1208. As indicated by state transition 5, UART 1100 waits for the host data at state 1210. After successful receipt of one or more packets of data from the host device, UART 1100 sends an ACK signal back to the host device, indicated as state transition 6 back to state 1208. UART 1100 might transition between states 1208 and 1210 one or more times, depending on the amount of data sent from the host device. Once UART 1100 receives all the data from the host device, UART 1100 runs the command, as indicated by state transition 7 to state 1204. Once the command is complete, UART 1100 sends an ACK signal as indicated by state transition 8 to state 1208. After the ACK signal is sent, UART 1100 might wait for a status request from the host device, as indicated by state transition 14 to state 1212. When UART 1100 receives the status request from the host device, UART 1100 responds with an ACK signal and status data, as indicated by state transition 9 to state 1206. Once the ACK signal and status data is sent, UART 1100 returns, as indicated by state transition 3, to state 1202 to wait to receive another command.

If the received command is a READ TRANSFER command, UART 1100 responds with an ACK signal, shown as state transition 4 to state 1208. UART 1100 runs the requested command, as indicated by state transition 8 to state 1204. As indicated by state transition 10, UART 1100 waits at state 1214 to send the requested data until the host device sends a data request. Once the host data request is received, UART 1100 sends a data block to the host device at state 1216, as indicated by state transition 11. If multiple data blocks are required for the command, UART 1100 might transition between states 1216 and 1214 one or more times until all data blocks are sent to the host device, as indicated by state transitions 11 and 12. As indicated by state transition 13, once all the data blocks are sent to the host device, UART 1100 waits at state 1212 for a status request from the host device. When UART 1100 receives the status request from the host device, UART 1100 responds with an ACK signal and status data, as indicated by state transition 9 to state 1206. Once the ACK signal and status data is sent, UART 1100 returns, as indicated by state transition 3, to state 1202 to wait to receive another command.

Figure 13:
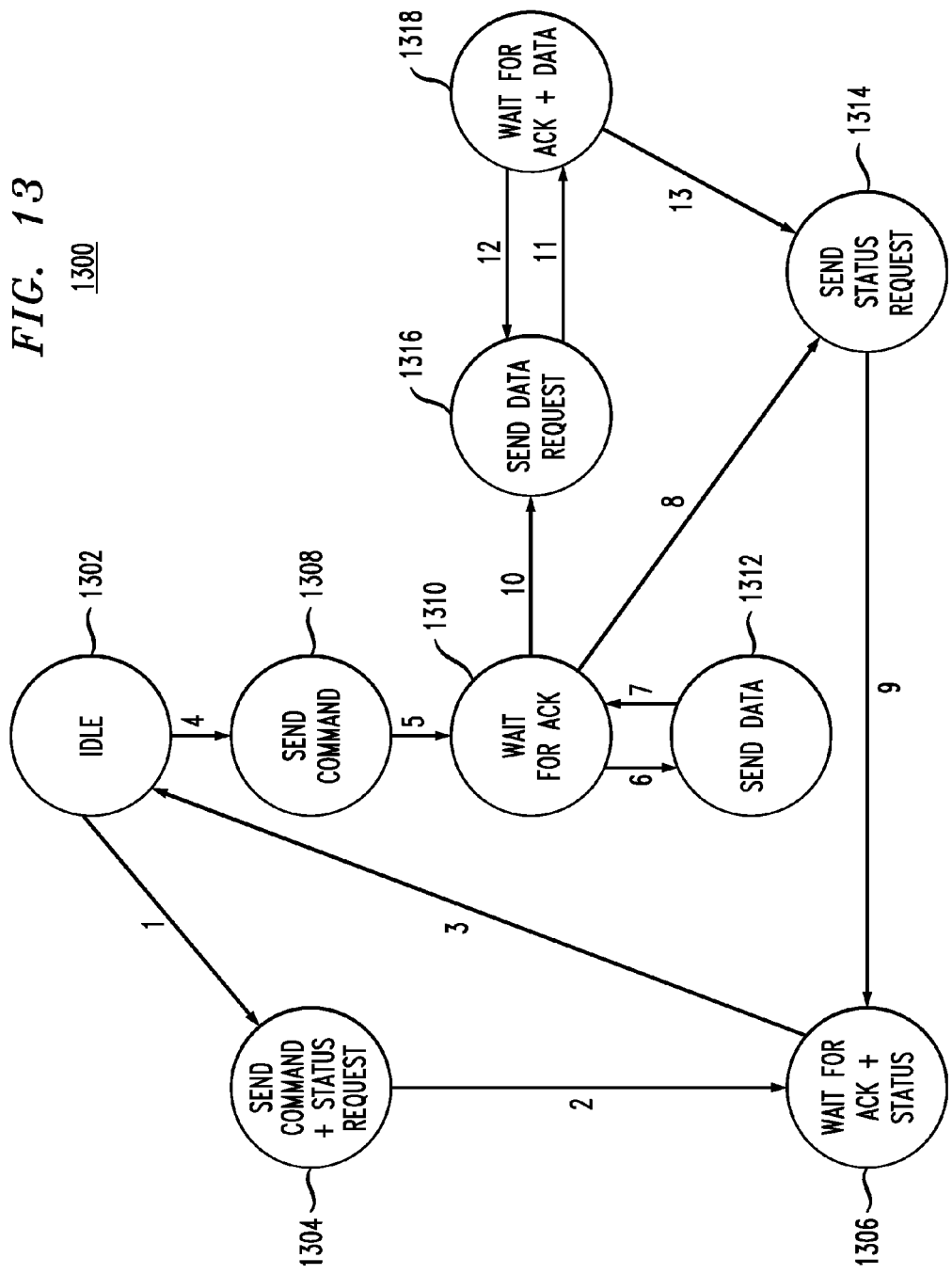
FIG. 13 shows a state diagram for a host device operating the CDT protocol in communication with the UART shown in FIG. 11.

FIG. 13 shows a state diagram of a host device operating in accordance with the CDT protocol. As described with regard to FIG. 12, a host device operating in accordance with the CDT protocol might generally send three types of commands: i) NO TRANSFER commands, ii) WRITE TRANSFER commands, and iii) READ TRANSFER commands. As shown in FIG. 13, a host device might generally wait at IDLE state 1302, waiting to send a CDT command to an embedded device, such as UART 1100 of media controller 104.

If the host device is sending a NO TRANSFER command, at state 1304, the host device sends the command to UART 1100, as indicated by state transition 1. The host device might also send a status request to UART 1100 along with the command. As indicated by state transition 2, the host device then waits at state 1306 for UART 1100 to reply with an ACK signal and status data. Once the host device receives the ACK signal and status device from UART 1100, the host device returns to IDLE state 1302, as indicated by state transition 3.

If the host device is sending a WRITE TRANSFER command, at state 1308, the host device sends the WRITE TRANSFER command to UART 1100, as indicated by state transition 4. Once the host device sends the WRITE TRANSFER command, the host device then waits for UART 1100 to reply with an ACK signal at state 1310, as indicated by state transition 5. Once the ACK signal is received, as indicated by state transition 6, at state 1312, the host device sends a data block to the device. As indicated by state transition 7, the host device returns to state 1310 to wait for the ACK signal from UART 1100. The host device might return to state 1312 and state 1310 one or more times, as indicated by state transitions 6 and 7, depending on how many data blocks are included in the WRITE TRANSFER command. As indicated by state transition 8, once the ACK signal for the last data block is received by the host device, the host device sends a status request to UART 1100 at state 1314. After sending the status request, the host device waits at state 1306 for the ACK signal and status data from UART 1100, as indicated by state transition 9. Once the host device receives the ACK signal and status device from UART 1100, the host device returns to IDLE state 1302, as indicated by state transition 3.

If the host device is sending a READ TRANSFER command, at state 1308, the host device sends the READ TRANSFER command to UART 1100, as indicated by state transition 4. Once the host device sends the READ TRANSFER command, the host device then waits for UART 1100 to reply with an ACK signal at state 1310, as indicated by state transition 5. Once the ACK signal is received, the host device sends a data request for at least one data block to UART 1100, as indicated by state transition 10. As indicated by state transition 11, the host device waits at state 1318 for UART 1100 to send the ACK signal and requested data. As indicated by state transitions 11 and 12, the host device might transition between states 1316 and 1318 one or more times, depending how many data blocks are requested in the READ TRANSFER command. As indicated by state transition 13, once the ACK signal for the last data block is received by the host device, the host device sends a status request to UART 1100 at state 1314. After sending the status request, the host device waits at state 1306 for the ACK signal and status data from UART 1100, as indicated by state transition 9. Once the host device receives the ACK signal and status device from UART 1100, the host device returns to IDLE state 1302, as indicated by state transition 3.

The logging data transfer ("LDT") protocol sends logging information from media controller 104 to the host device. In embodiments of the present invention, the LDT protocol sends datagram type packets asynchronously interleaved with CDT packet traffic (if any). For example, an LDT packet might be sent by UART 1100 in between the states shown in FIG. 12. LDT checksum errors might be detected by the host device for an LDT packet, but there is no way for the host device to re-request the packet from UART 1100, and the host device and UART 1100 do not send ACK signals for LDT packets. Since no timeouts or retries are implemented in the LDT protocol, a packet is sent only once, whether the host receives it correctly or not. If a packet is not properly received, the host device might choose to ignore the entire packet.

LDT packets might be fixed or variable length. Logging information might generally include a timestamp, a sequence number of a process operating on media controller 104, and variable data, such as, for example internal log files maintained by media controller 104 for tracking, for example, firmware faults, error codes or other firmware statistics. Embodiments of the present invention might employ the SLIP ("Serial Line Internet Protocol") protocol to transfer binary data.

As described herein, embodiments of the present invention might employ one or more processors in a single SoC or be implemented as an embedded system having one or more distributed microprocessors. Embodiments of the present invention provide for bundling one or more binary images together into a single binary package file. In systems employing multiple processors, each processor might be loaded with a unique firmware binary image file and initialization data. Thus, it is beneficial to update the firmware for each of the processors as a "set" to maintain proper operation of the SoC. Thus, embodiments of the present invention package all required binary images into one package file, which updates all binary images of the system in a single update and eliminates the need to check compatibility between the one or more binary files of the system. If, in the process of updating the one or more images contained within the package file, one update fails, the entire update might be considered "failed".

In an embedded system having multiple processors, one processor is generally employed as a boot processor, meaning that it is the first processor to start up. The boot processor might direct the boot sequence of any other processors and components within the embedded system. The boot processor generally might boot using data stored in a static read-only memory (ROM). For example, the ROM might be included in infrastructure subsystem 213 of FIG. 2.

The data stored in the ROM might include memory addresses for other elements of the operating system and firmware. When a firmware update is performed, the boot processor might start-up based on data stored in the ROM, and then find and access and decrypt the binary image package file. One or more versions of system firmware (i.e. one or more image package files) might be stored in a reserved area of the media 118. As described in related U.S. patent application Ser. No. 12/643,471, filed Dec. 21, 2009, media 118 might be divided into one or more separate physical spaces, such as an anchor space, a reserved space and a data space. The anchor space might contain data that must be stored in particular physical position in media 118, for example a portion of the software or firmware for media controller 104, or configuration files or other data required by media controller 104 at power up. The boot processor might then extract the relevant individual binary images for each of the processors in the system, and provide the update images to each processor.

One or more firmware package versions might be stored in media 118: i) a "GOOD" version is the current, booted, presumably good version; ii) a "NEW" version might be an incoming image package file for a firmware update; and iii) a "BAD" version might be an incomplete or failed update. For example, upon a system reset, the boot processor will attempt to boot the new, incoming version of firmware. If the new version is successfully booted, the boot processor will mark the new image file as "GOOD". If the new version does not boot properly, the system will revert to the previous version, which is still marked "GOOD", and boot the previous version. The boot processor might also mark the new image file as "BAD", or might delete the new image file entirely. Thus, embodiments of the present invention provide some protection against the system becoming locked up due to a bad or aborted firmware update.

In embodiments of the present invention, the binary image package file might be encrypted employing any desired encryption algorithm using a shared key (i.e. XTEA). Encryption might be desired to thwart a hacker's attempt to modify the existing image package. When loaded to the intended embedded device, the package is first decrypted by the boot processor using the shared key, and then is extracted.

Figure 14:
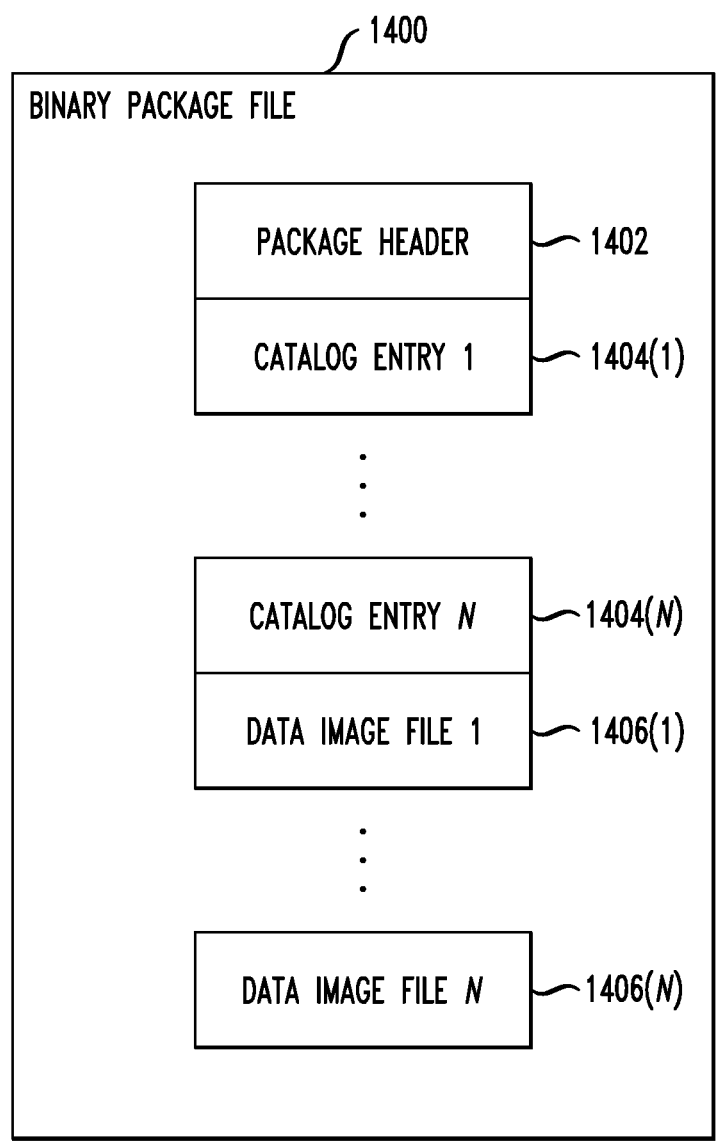
FIG. 14 shows an exemplary binary package file, in accordance with exemplary embodiments of the present invention.

FIG. 14 shows an exemplary binary package file, 1400, which might be employed by embodiments of the present invention to update firmware on one more processors of media controller 104. As shown in FIG. 14, each binary image package file includes three basic blocks: i) a single "package header" 1402, ii) one or more "catalog entries" 1404(1)-(N), and iii) one or more data image files 1406(1)-1406(N). Each catalog entry 1404(1)-(N) corresponds to a data image file 1406(1)-1406(N) in binary package file 1400. Each of the one or more "image files" 1406(1)-1406(N) might include firmware images (e.g., a firmware update), data images (e.g., initialization data), firmware overlays (e.g., segments of the operating code that fit within an executable memory of media controller 104).

Figure 15:
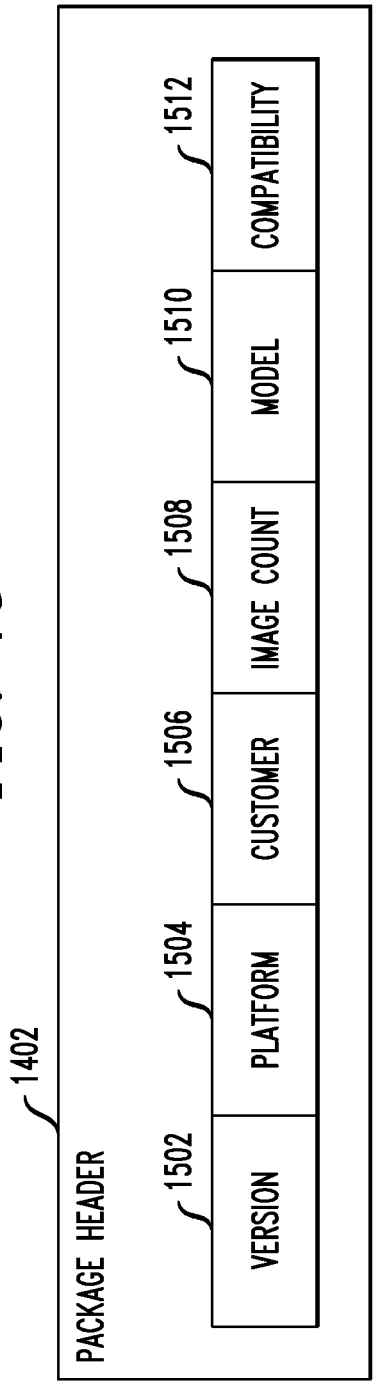
FIG. 15 shows an exemplary package header of the binary package file of FIG. 14.

FIG. 14 shows an exemplary package header, 1402, of binary package file 1400. The number of fields of package header 1402 is variable, but the overall size of package header 1402 is fixed. As shown in FIG. 15, package header 1402 includes Version field 1502, Platform field 1504, Customer field 1506, ImageCount field 1508, Model field 1510, Compatibility field 1512 and external package version field 1514. Version field 1502 might indicate a version number of the format of binary package file 1400. Platform field 1504 and Model field 1510 might indicate a specific platform and model for binary package file 1400. For example, Platform field 1504 and Model field 1510 might indicate what implementation of media controller 104 binary package file 1400 is designed to implement (e.g., enterprise, consumer, etc.). Customer field 1506 might indicate a customer number of the end user of media controller 104. ImageCount field 1508 indicates the number of data image files included in binary package file 1400. ImageCount field 1508 is desirably located at a fixed location relative to the start of package header 1402, such that the boot processor can determine the number of image files included in the package file. Compatibility field 1512 might indicate any previous releases of binary package file 1400 with which the current release is compatible. Other fields might be included if required.

Figure 16:
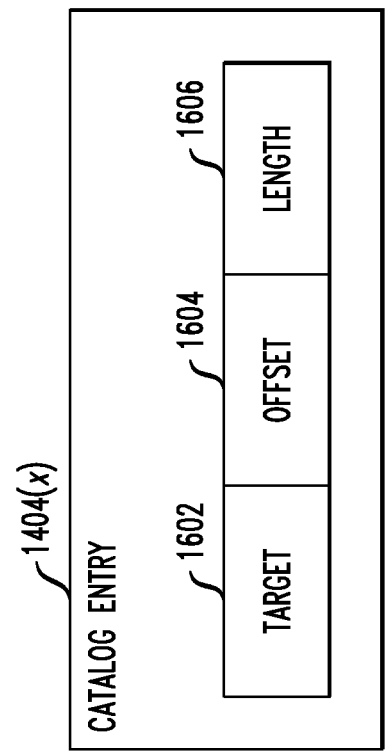
FIG. 16 shows an exemplary catalog entry of the binary package file of FIG. 14.

FIG. 16 shows an exemplary package catalog entry, 1404($x$). As shown, catalog entry 1404($x$) might include three fields: i) Target field 1602, ii) Offset field 1604, and iii) Length field 1606. Target field 1602 might indicate which module of media controller 104 should receive the image file corresponding to catalog entry 1404 (e.g., data image file 1406($x$)). Offset field 1604 indicates the starting location in the package file of the image file corresponding to catalog entry 1504 (e.g., data image file 1506($x$)). Length field 1606 indicates the length of the image file corresponding to catalog entry 1404 (e.g., data image file 1406($x$)). The boot processor uses offset field 1604 and length field 1606 to extract each individual data image file 1406($x$) from package file 1400. The boot processor then uses target field 1602 to provide the extracted image file 1406($x$) to the appropriate module of media controller 104.

Figure 17:
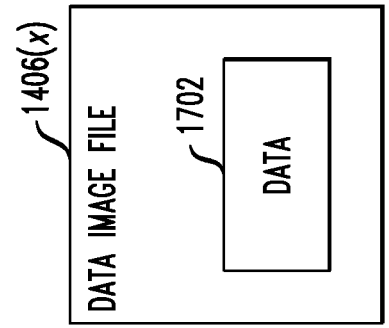
FIG. 17 shows an exemplary data image file of the binary package file of FIG. 14.

FIG. 17 shows an exemplary data image file, 1406($x$). As shown, the data image file generally contains data 1702, which might include firmware, initialization data or other data.

Therefore, as described herein, embodiments of the present invention provide a transceiver for transferring data between a media controller and a host device through a communication link. The transceiver includes a first interrupt generator configured to i) generate a first interrupt when a command is received from the host device and ii) provide the received command to a receive buffer. A command processing module i) retrieves the received command from the receive buffer, ii) processes the received command, and iii) provides data request data in response to the received command to a transmit buffer. A datagram generator is configured to provide datagram data to the transmit buffer and a second interrupt generator is configured to generate a second interrupt when data in the transmit buffer is ready for transmission. The transmit buffer interleaves i) the data request data in response to the received command and ii) the datagram data, when provided to the communication link.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of processing, by a media controller, a command received from a host device coupled to the media controller by a communication link, the method comprising:
    normalizing, by a first command processing module, the received command from a host specific protocol to a common command format;
    generating, by a first interrupt generator, a first interrupt when the command is received;

providing, by a host command processing and scheduler module, the received normalized command to a common command processing module;
transmitting an acknowledge signal to the host device;
if the received command includes a data transfer from the host device:
   allocating, by the common command processing module, memory in a receive buffer for the command;
   transferring data from the host device to the receive buffer;
   processing, by the common command processing module of the media controller, the received command including the transferred data, if present;
   transferring, by an application programming interface, data from the receive buffer to a processing module of the media controller corresponding to received command:
   processing, by the corresponding processing module of the media controller, the transferred data;
if the received command includes a data transfer to the host device:
   receiving a data request from the host device;
   providing, by the corresponding processing module of the media controller, data corresponding to the data request to the common command processing module by the application programming interface;
   providing, by the common command processing module, data corresponding to the data request to the transmit buffer; and
   generating, by a second interrupt generator, a second interrupt when the data corresponding to the data request in the transmit buffer is ready for transmission;
   providing, by a datagram generator of the media controller, datagram data to the transmit buffer, wherein the datagram data comprises logging data of the media controller and wherein the datagram data is generated substantially independently of processing commands received from the host device, wherein the datagram data is of variable length and the datagram data comprises one or more of a timestamp, a sequence number of a process operating on the media controller, and log data documenting statistics of the media controller, the statistics comprising at least one of error codes and operating statistics; and
   interleaving, by the transmit buffer, transmission of i) the data corresponding to the data request and ii) the datagram data on the communication link, wherein the data corresponding to the data request is transmitted to the host device by a synchronous protocol and the interleaving of datagram data is performed asynchronously with respect to the transmission of the data corresponding to the data request,
wherein the host command processor and scheduler module validates the received command, schedules the command processing, completes the received command, and performs a command error handling.

2. The method recited in claim 1, further comprising:
arbitrating access to the transmit buffer between the command processing module and the datagram generator.

3. The method recited in claim 1, wherein the received command is one of
   i) a write transfer command,
   ii) a read transfer command, and
   iii) a no transfer command, wherein
   the write transfer command comprises one of
      i) writing one or more registers of the media controller,
      ii) writing one or more memory addresses of a buffer of the media controller, and
      iii) writing one or more addresses of a storage media coupled to the media controller; and
   the read transfer command comprises one of
      i) reading one or more registers of the media controller,
      ii) reading one or more memory addresses of the buffer of the media controller, and
      iii) reading one or more addresses of the storage media coupled to the media controller.

4. The method of claim 3, wherein the storage media is a Redundant Array of independent Disks (RAID) system comprising a plurality of storage devices and at least one media controller coupled to at least one corresponding storage device.

5. A non-transitory machine-readable storage medium, having encoded thereon program code, wherein, when the program code is executed by a machine, the machine implements a method of processing, by a media controller, a command received from a host device coupled to the media controller by a communication link, the method comprising:
   normalizing, by a first command processing module, the received command from a host-specific protocol to a common command format;
   generating, by a first interrupt generator, a first interrupt when the command is received;
   providing, by a host command processing and scheduler module, the normalized command to a common command processing module;
   transmitting an acknowledge signal to the host device;
   if the received command includes a data transfer from the host device:
      allocating, by the common command processing module, memory in a receive buffer for the command;
      transferring data from the host device to the receive buffer;
      processing, by the common command processing module of the media controller, the received command including the transferred data, if present;
      transferring, by an application programming interface, data from the receive buffer to a processing module of the media controller corresponding to the received command;
      processing, by the corresponding processing module of the media controller, the transferred data;
   if the received command includes a data transfer to the host device:
      receiving a data request from the host device;
      providing, by the corresponding processing module of the media controller, data corresponding to the data request to the common command processing module by an application programming interface;
      providing, by the common command processing module, data corresponding to the data request to the transmit buffer; and
      generating, by a second interrupt generator, a second interrupt when the data corresponding to the data request in the transmit buffer is ready for transmission;
      providing, by a datagram generator of the media controller, datagram data to the transmit buffer, wherein the datagram data comprises logging data of the media controller and wherein the datagram data is generated substantially independently of processing commands received from the host device, wherein the datagram data is of variable length and the datagram data comprises one or more of a timestamp, a sequence number of a process operating on the media controller, and log data documenting statistics of the media controller, the statistics comprising at least one of error codes and operating statistics; and interleaving, by the transmit buffer, transmission of i) the data corresponding to the data request and ii) the datagram data on the communication link, wherein the data corresponding to the data request is transmitted to the host device by a synchronous protocol and the interleaving of datagram data is performed asynchronously with respect to the transmission of the data corresponding to the data request, wherein the host command processor and scheduler module validates the received command, schedules the command processing, completes the received command, and performs a command error handling.

6. The non-transitory machine-readable storage medium recited in claim 5, further comprising:

arbitrating access to the transmit buffer between the command processing module and the datagram generator.

7. The non-transitory machine-readable storage medium recited in claim 5, wherein the received command is one of i) a write transfer command, ii) a read transfer command, and iii) a no transfer command, wherein the write transfer command comprises one of i) writing one or more registers of the media controller, ii) writing one or more memory addresses of a buffer of the media controller, and iii) writing one or more addresses of a storage media coupled to the media controller; and the read transfer command comprises one of i) reading one or more registers of the media controller, ii) reading one or more memory addresses of the buffer of the media controller, and iii) reading one or more addresses of the storage media coupled to the media controller.

8. A transceiver for transferring data between a media controller and a host device through a communication link, the transceiver comprising:

a first command processing module configured to (i) normalize the received command from a host-specific protocol to a common command format and (ii) transmit an acknowledge signal to the host device;

a first interrupt generator configured to (i) generate a first interrupt when a command is received from the host device, (ii) provide the normalized command to a common command processing module, and (iii) provide the normalized received command to a receive buffer;

the common command processing module configured to (i) allocate memory in the receive buffer for the normalized command: (ii) retrieve the normalized command from the receive buffer, (iii) process the normalized command, and iii) provide data request data in response to the received command to a transmit buffer;

an application programming interface configured to i) transfer data from the receive buffer to a processing module of the media controller corresponding to received command, the corresponding processing module of the media controller configured to process the transferred data and (ii) transfer data from the corresponding processing module of the media controller to the transmit buffer, the data corresponding to the data request;

a datagram generator configured to provide datagram data to the transmit buffer, wherein the datagram data comprises logging data of the media controller and wherein the datagram data is provided substantially independently of processing commands received from the host device, wherein the datagram data is of variable length and the datagram data comprises one or more of a timestamp, a sequence number of a process operating on the media controller, and log data documenting statistics of the media controller, the statistics comprising at least one of error codes and operating statistics;

a second interrupt generator configured to generate a second interrupt when data request data in the transmit buffer is ready for transmission;

wherein the transmit buffer is further configured to interleave i) the data request data in response to the received command and ii) the datagram data, when provided to the communication link, wherein the data corresponding to the data request is transmitted to the host device by a synchronous protocol and the interleaving of datagram data is performed asynchronously with respect to the transmission of the data corresponding to the data request, wherein a host command processor and scheduler module validates the received command, schedules the command processing, completes the received command, and performs a command error handling.

9. The transceiver recited in claim 8, further comprising a multiplexer adapted to control access to the transmit buffer by the command processing module and the datagram generator.

10. The transceiver recited in claim 8, wherein the transceiver is a universal asynchronous receiver/transmitter (UART).

11. The transceiver recited in claim 8, wherein the communication link is an RS-232 serial link.

12. The transceiver recited in claim 8, wherein the communication link operates in accordance with the serial line internet protocol (SLIP).

13. The transceiver recited in claim 8, wherein the received command is one of i) a write transfer command, ii) a read transfer command, and iii) a no transfer command, wherein the write transfer command receives data from the host device and the read transfer command transmits data to the host device.

14. The transceiver recited in claim 13, wherein the write transfer command comprises one of i) a command to write one or more registers of the media controller, ii) a command to write one or more memory addresses of a buffer of the media controller, and iii) a command to write one or more addresses of a storage media coupled to the media controller;

the read transfer command comprises one of i) a command to read one or more registers of the media controller, ii) a command to read one or more memory addresses of the buffer of the media controller, and iii) a command to read one or more addresses of the storage media coupled to the media controller.

15. The transceiver recited in claim 8, wherein the apparatus is implemented in a monolithic integrated circuit chip.

* * * * *